(12) United States Patent
You et al.

(10) Patent No.: US 12,692,154 B2
(45) Date of Patent: *Jul. 28, 2026

(54) COMBINED REFORMING APPARATUS

(71) Applicant: DOOSAN ENERBILITY CO., LTD, Changwon (KR)

(72) Inventors: Su Nam You, Yongin (KR); Bong Keun Kim, Yongin (KR); Gyeong Mo Nam, Yongin (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 354 days.

This patent is subject to a terminal disclaimer.

(21) Appl. No.: 18/477,473

(22) Filed: Sep. 28, 2023

(65) Prior Publication Data

US 2024/0025738 A1     Jan. 25, 2024

Related U.S. Application Data

(63) Continuation-in-part of application No. 17/548,573, filed on Dec. 12, 2021, now Pat. No. 11,813,584.

(30) Foreign Application Priority Data

Jun. 10, 2021     (KR) ........................ 10-2021-0132413

(51) Int. Cl.
*C01B 3/384*          (2026.01)
*C01B 32/40*          (2017.01)
(52) U.S. Cl.
CPC .............. *C01B 3/384* (2013.01); *C01B 32/40* (2017.08); *C01B 2203/0233* (2013.01); *C01B 2203/0238* (2013.01); *C01B 2203/0811* (2013.01); *C01B 2203/1241* (2013.01); *C01B 2203/141* (2013.01)

(58) Field of Classification Search
CPC .... C01B 3/00; C01B 3/02; C01B 3/32; C01B 3/34; C01B 3/38; C01B 3/384; C01B 32/00; C01B 32/40; C01B 2203/00; C01B 2203/02; C01B 2203/0205; C01B 2203/0227; C01B 2203/0233; C01B 2203/0238; C01B 2203/08; C01B 2203/0805; C01B 2203/0811; C01B 2203/12; C01B 2203/1205; C01B 2203/1211; C01B 2203/1235; C01B 2203/1241; C01B 2203/14; C01B 2203/141

See application file for complete search history.

(56) References Cited

U.S. PATENT DOCUMENTS

| | | | | |
|---|---|---|---|---|
| 11,813,584 | B2 * | 11/2023 | You | ........................... B01J 6/008 |
| 12,172,895 | B2 * | 12/2024 | Nam | ....................... C01B 3/382 |
| 2003/0054213 | A1 | 3/2003 | Ishikawa | |
| 2008/0247942 | A1 | 10/2008 | Kandziora | |
| 2023/0105183 | A1 * | 4/2023 | Nam | ....................... B01J 8/065 |
| | | | | 423/652 |
| 2024/0017230 | A1 * | 1/2024 | Nam | ....................... B01J 8/067 |

OTHER PUBLICATIONS

The KR OA dated on Sep. 18, 2023.

* cited by examiner

*Primary Examiner* — Natasha E Young
(74) *Attorney, Agent, or Firm* — Harvest IP Law, LLP

(57)          ABSTRACT

A combined reforming apparatus is provided. The combined reforming apparatus includes two or more catalyst tubes reacting at different temperatures, and allows different reforming reactions to be performed subsequently as the combustion gas supplies heat to two or more catalyst tubes one after another.

21 Claims, 20 Drawing Sheets

[FIG. 1]
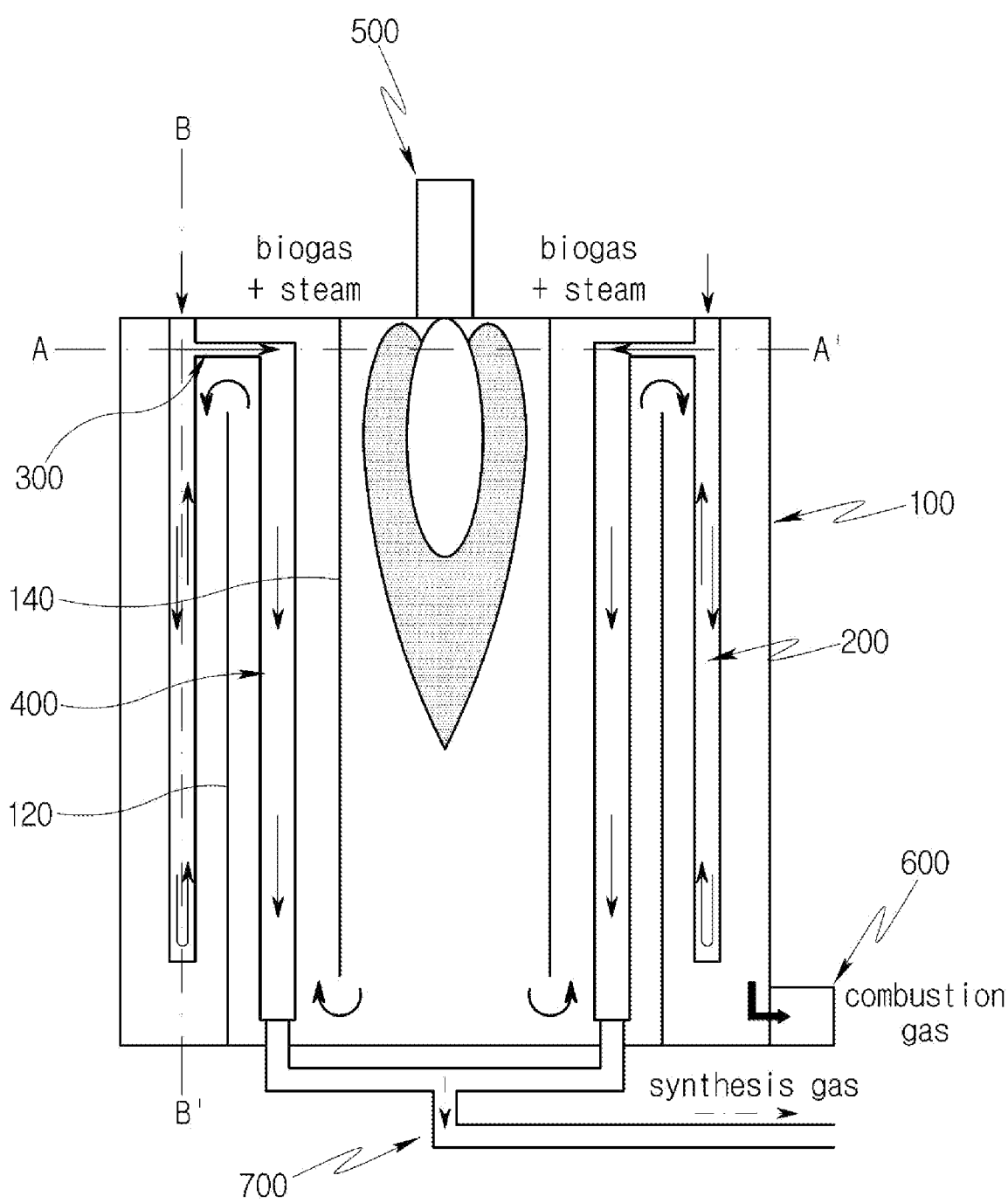

[FIG. 2]
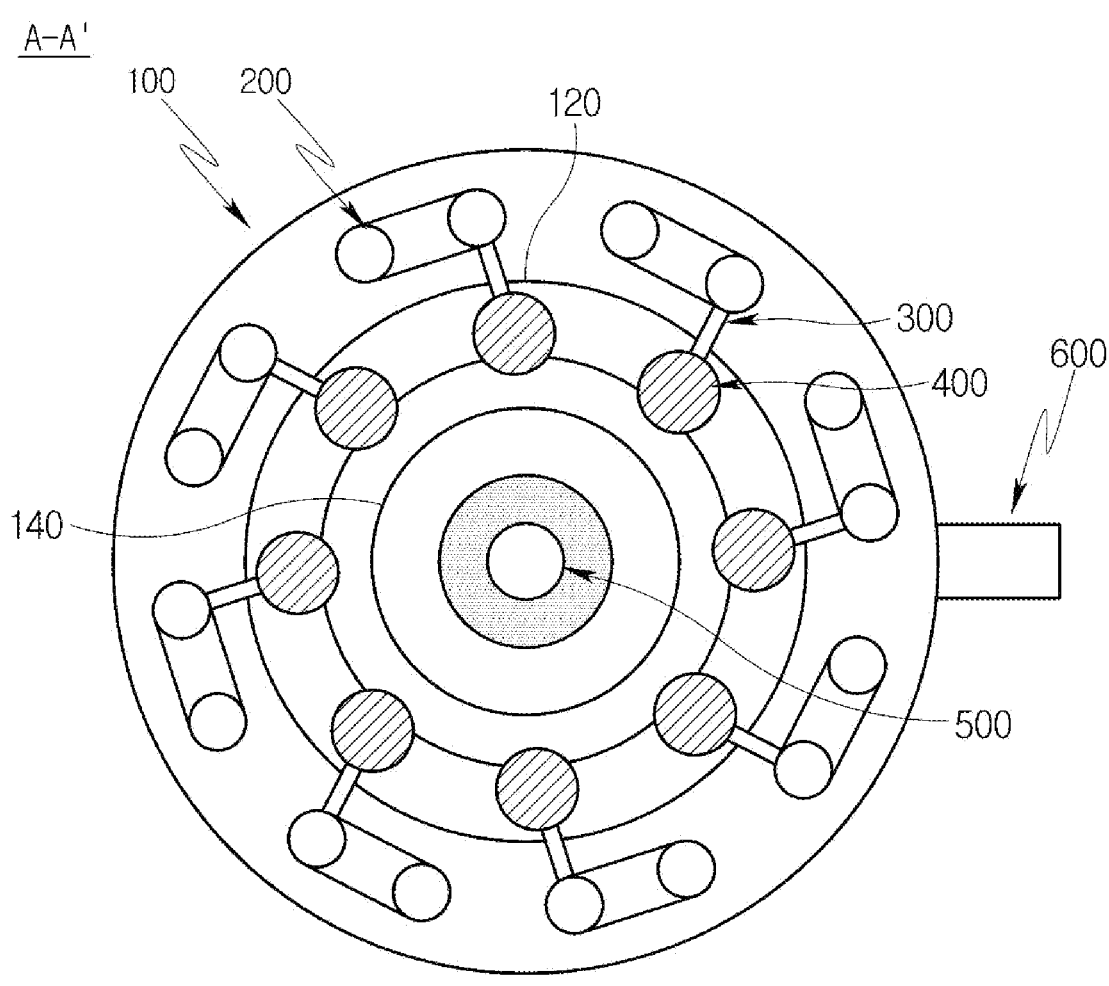

[FIG. 3]
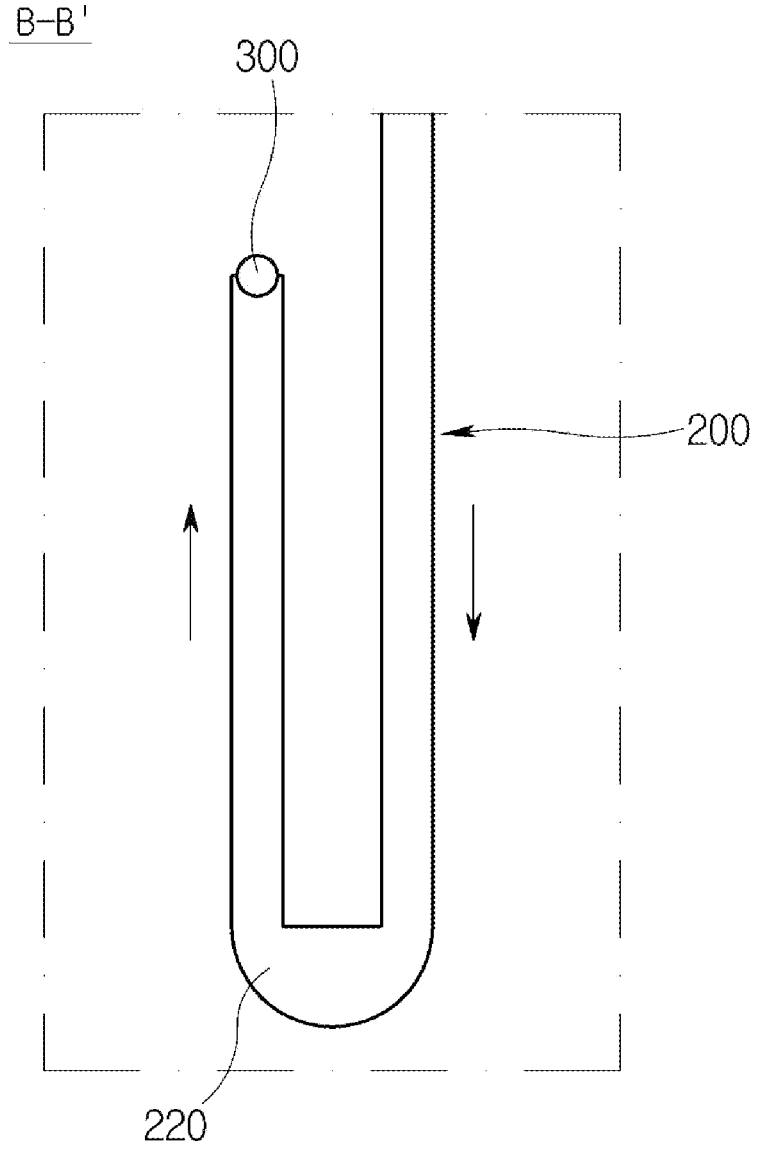

[FIG. 4]
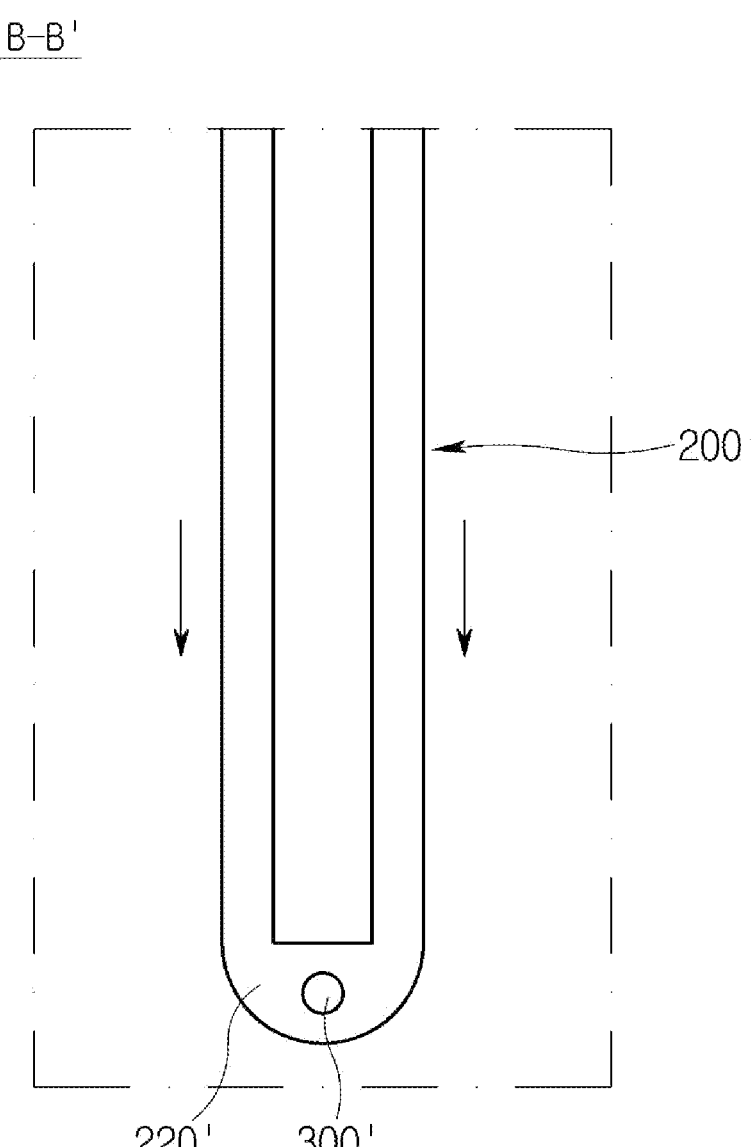

[FIG. 5]
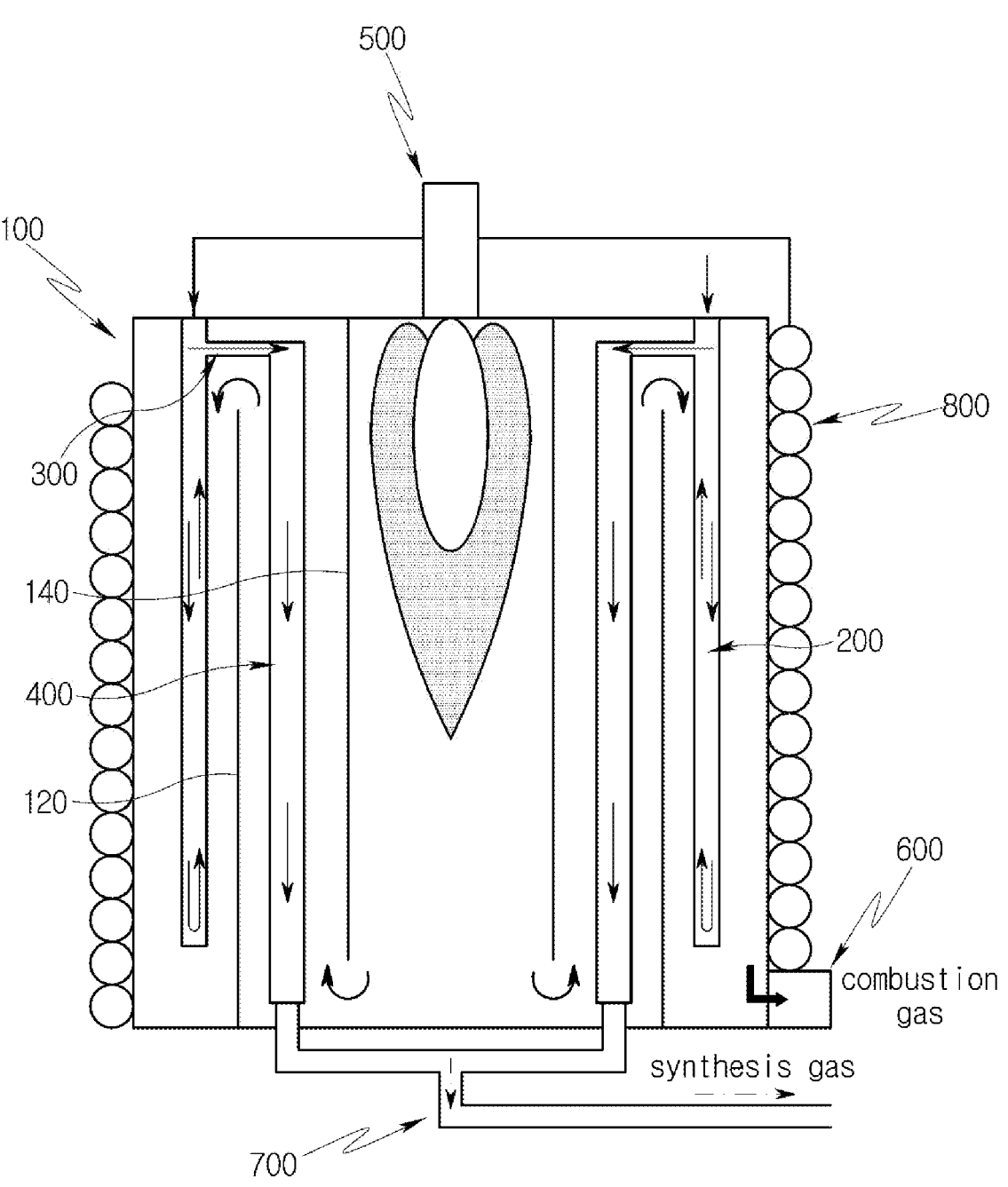

[FIG. 6]
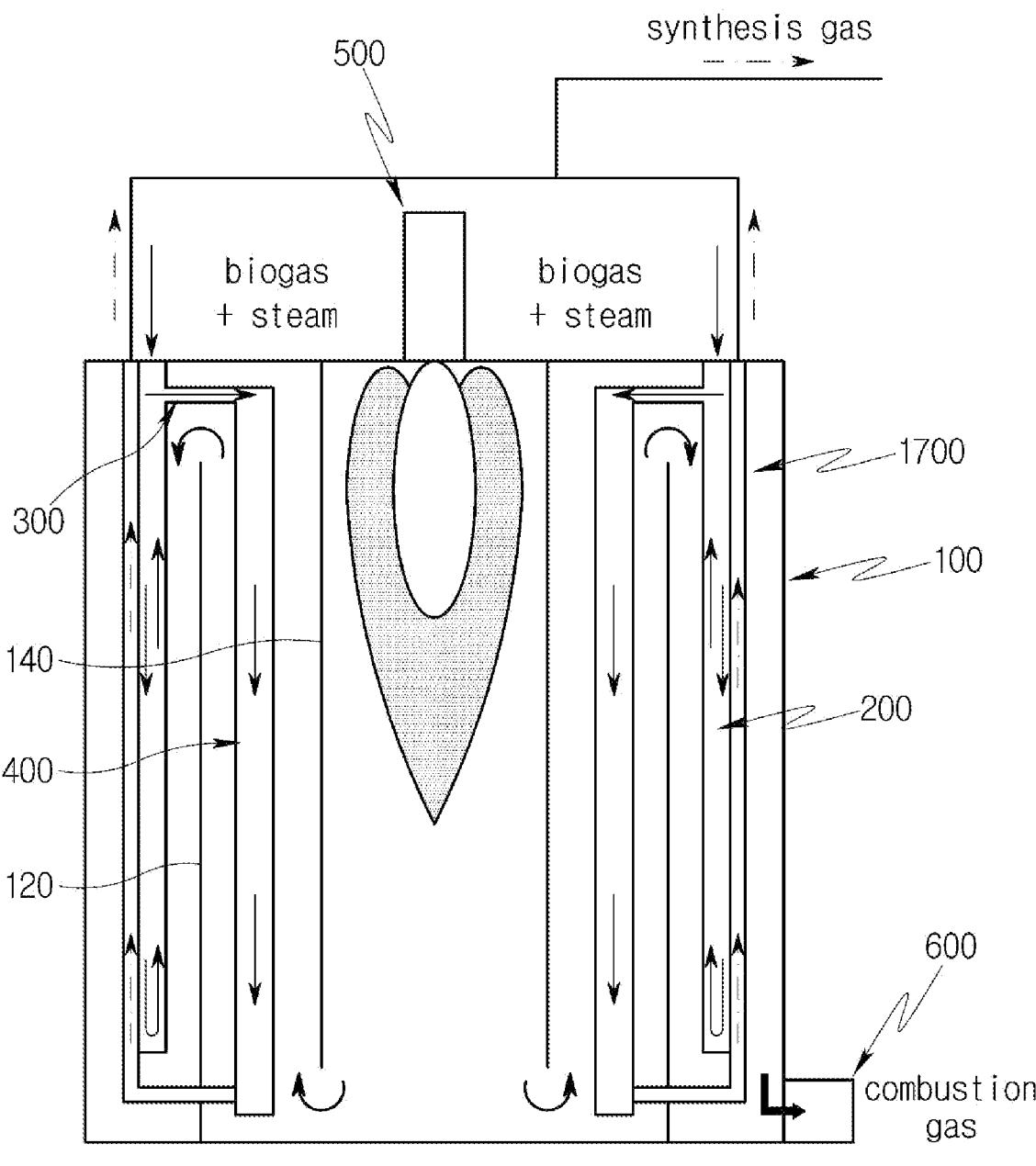

[FIG. 7]
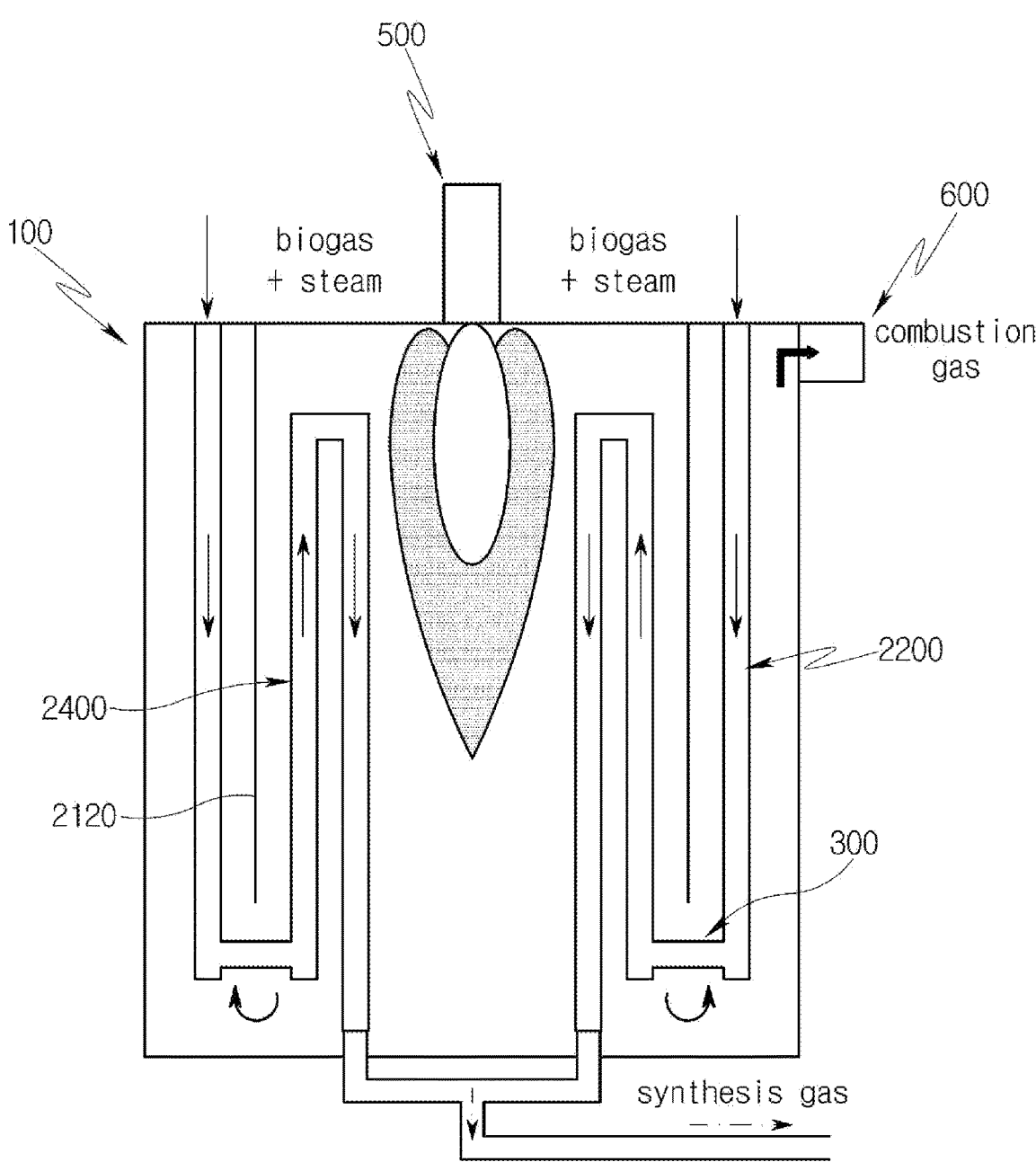

[FIG. 8]
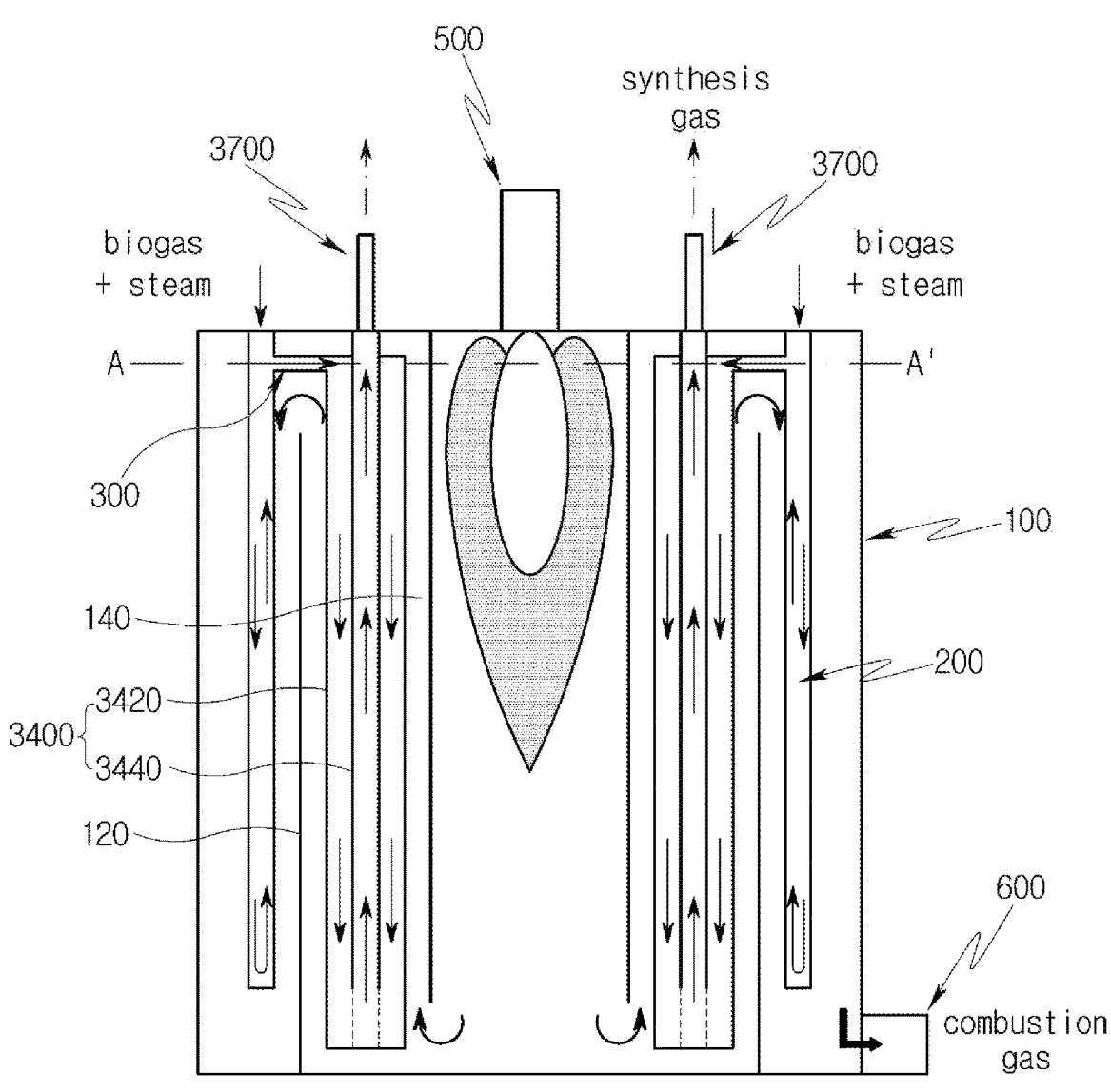

[FIG. 9]
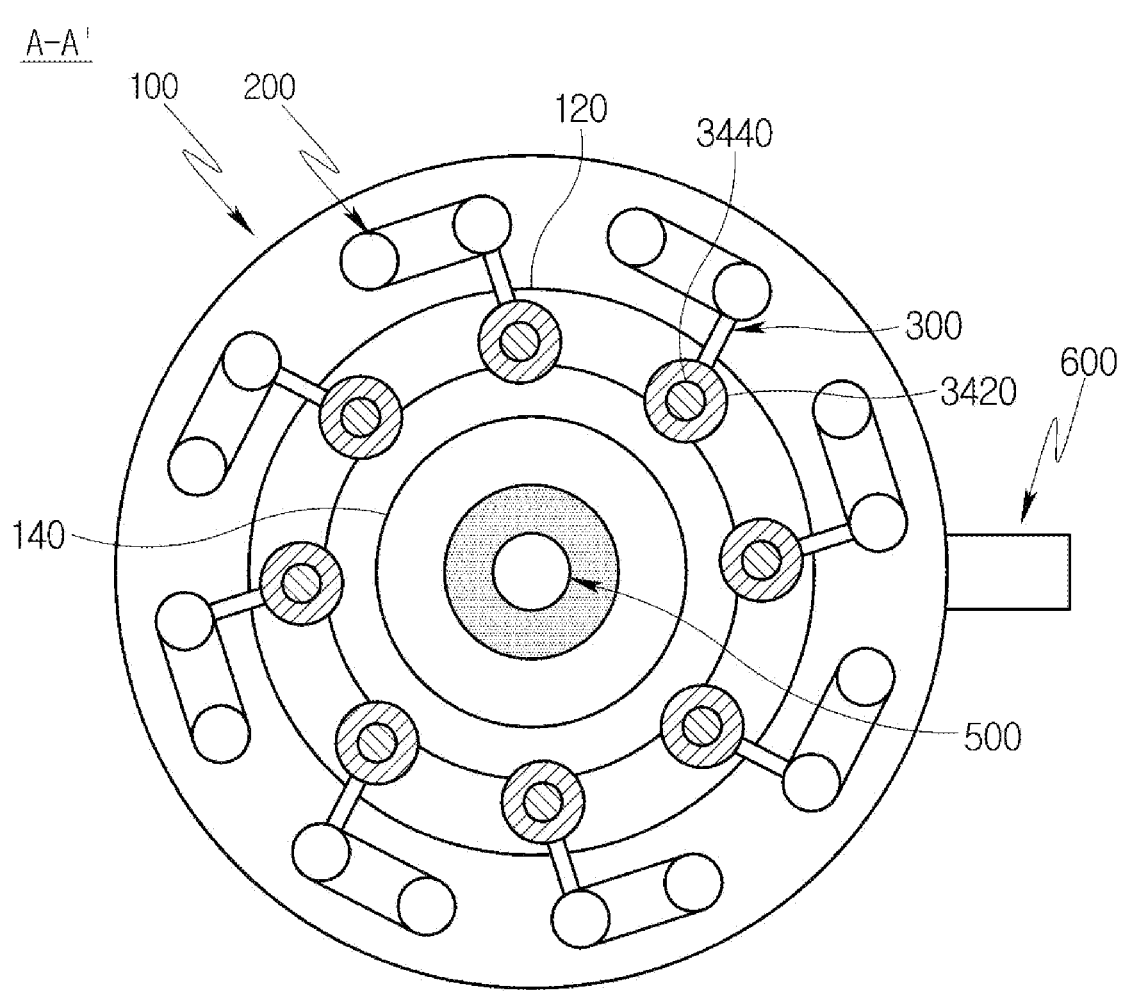

[FIG. 10]
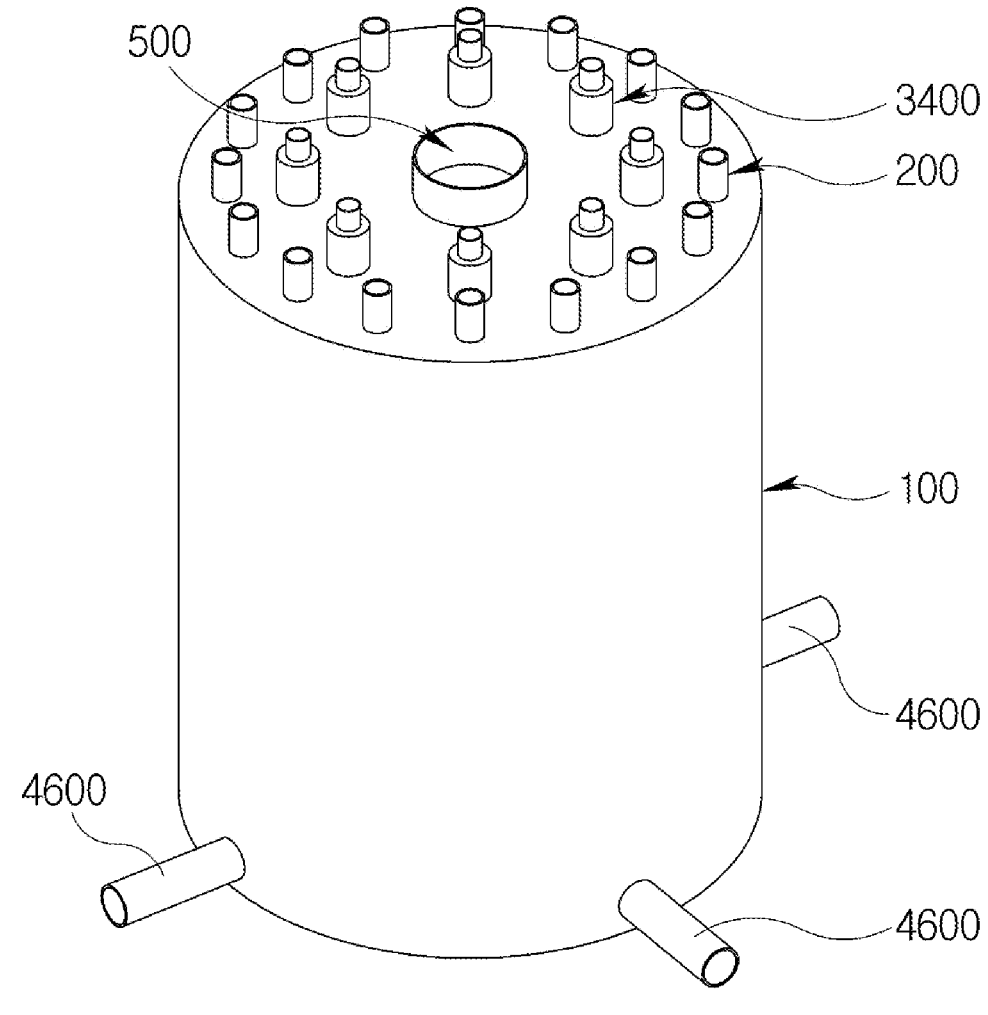

[FIG. 11]
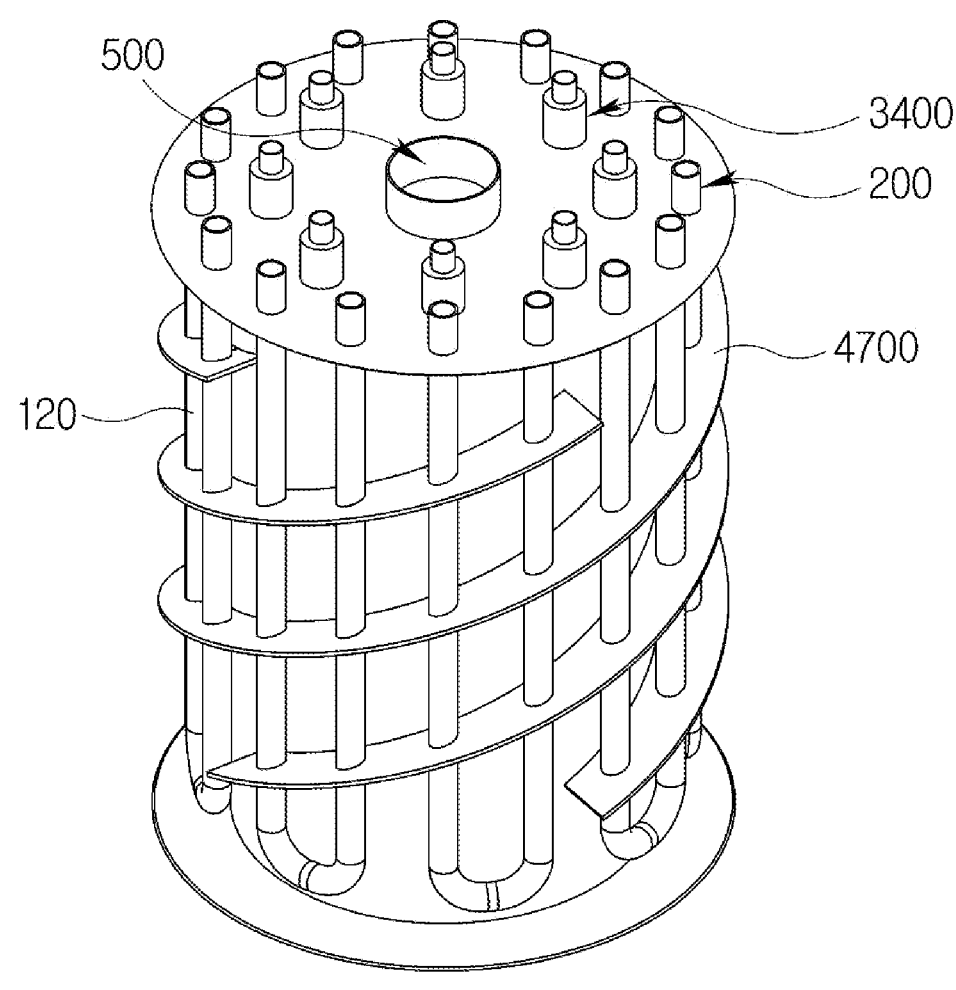

[FIG.12]
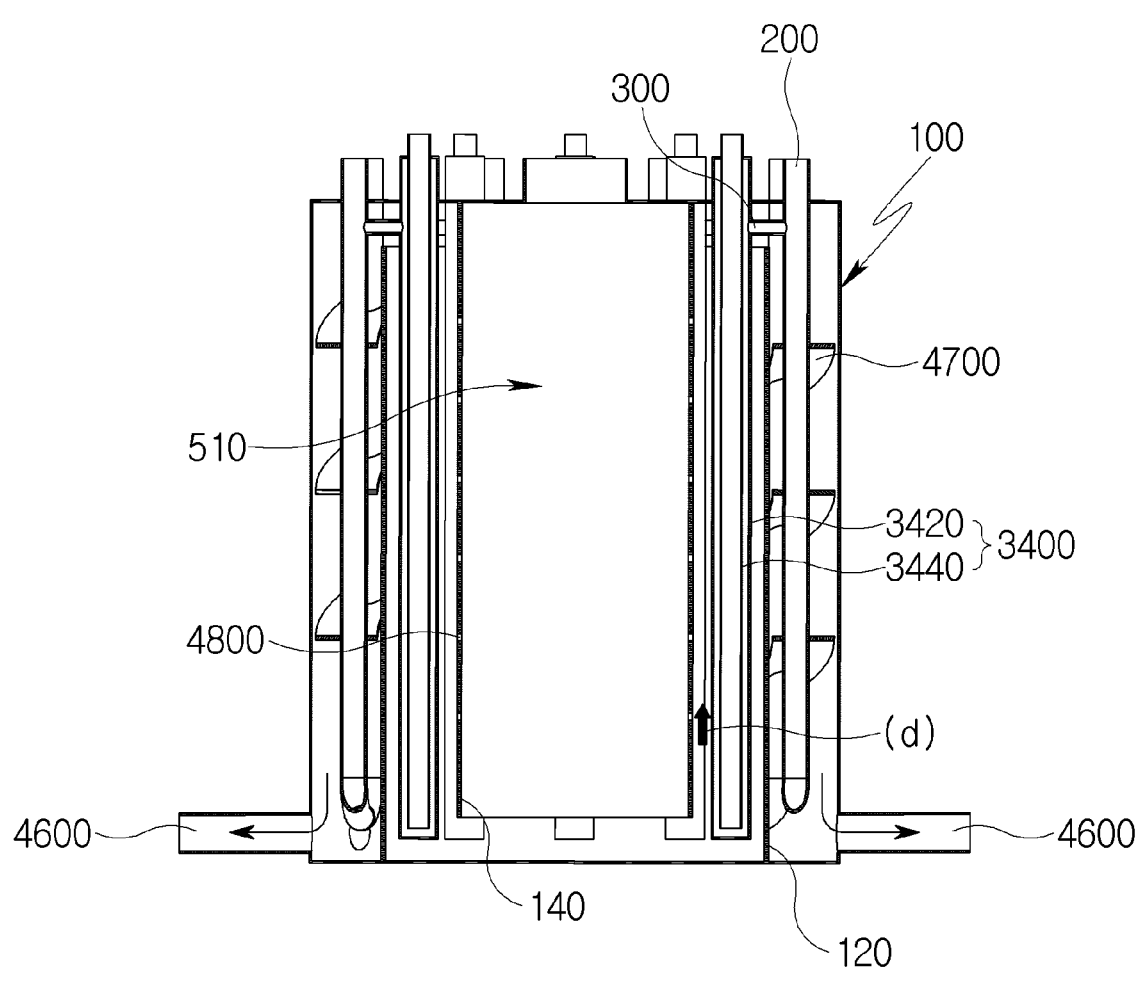

[FIG. 13]
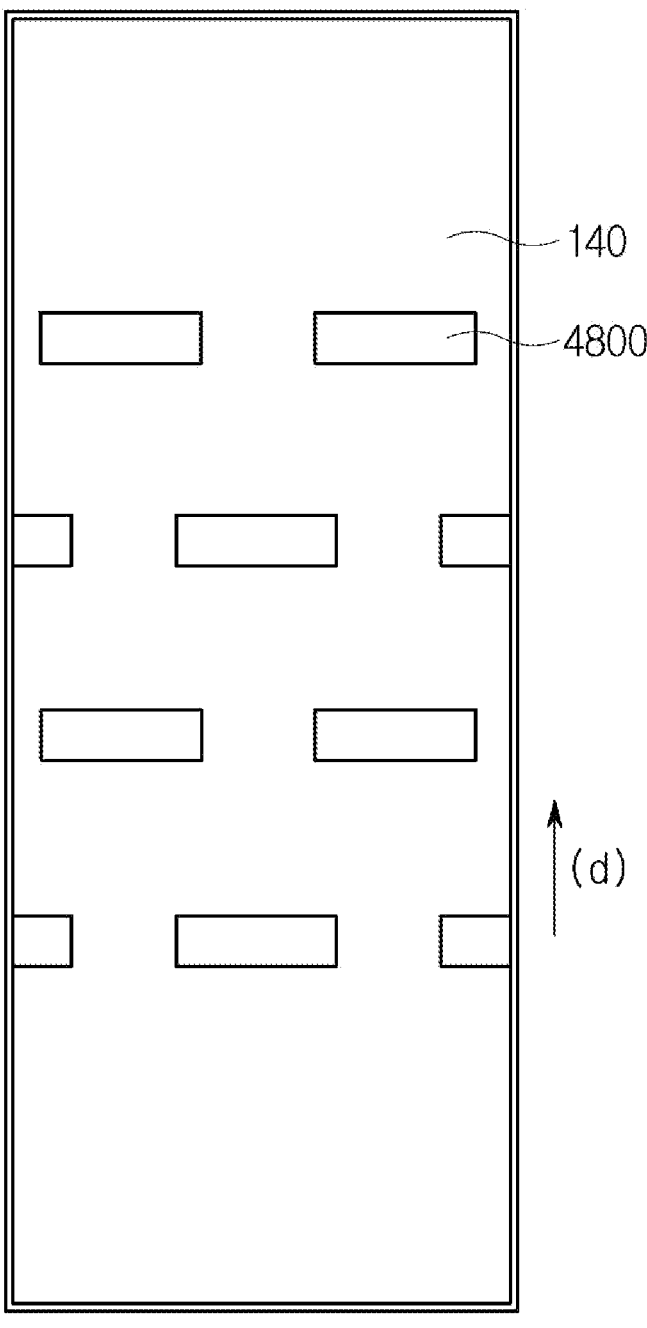

[FIG. 14]
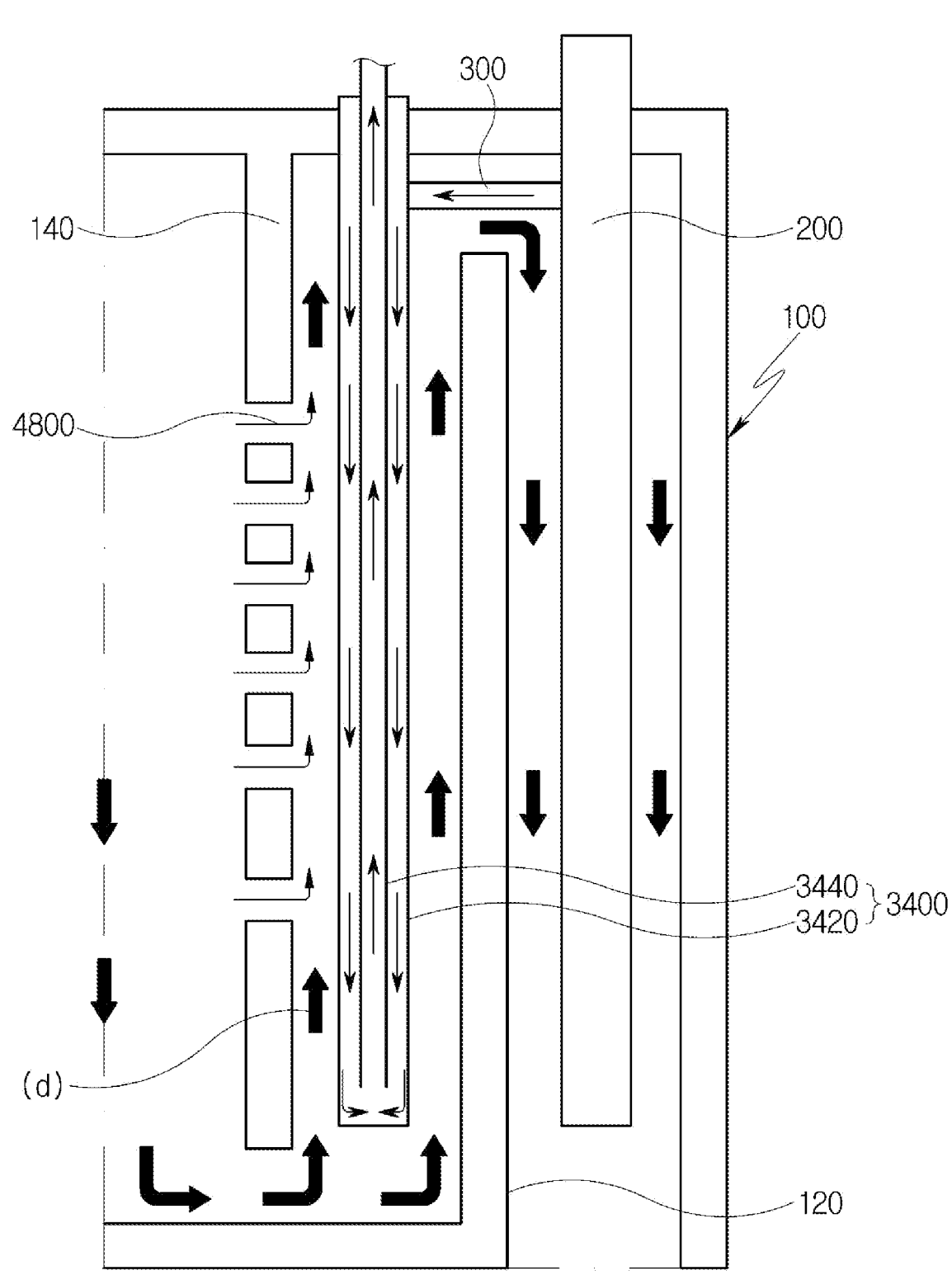

[FIG. 15]
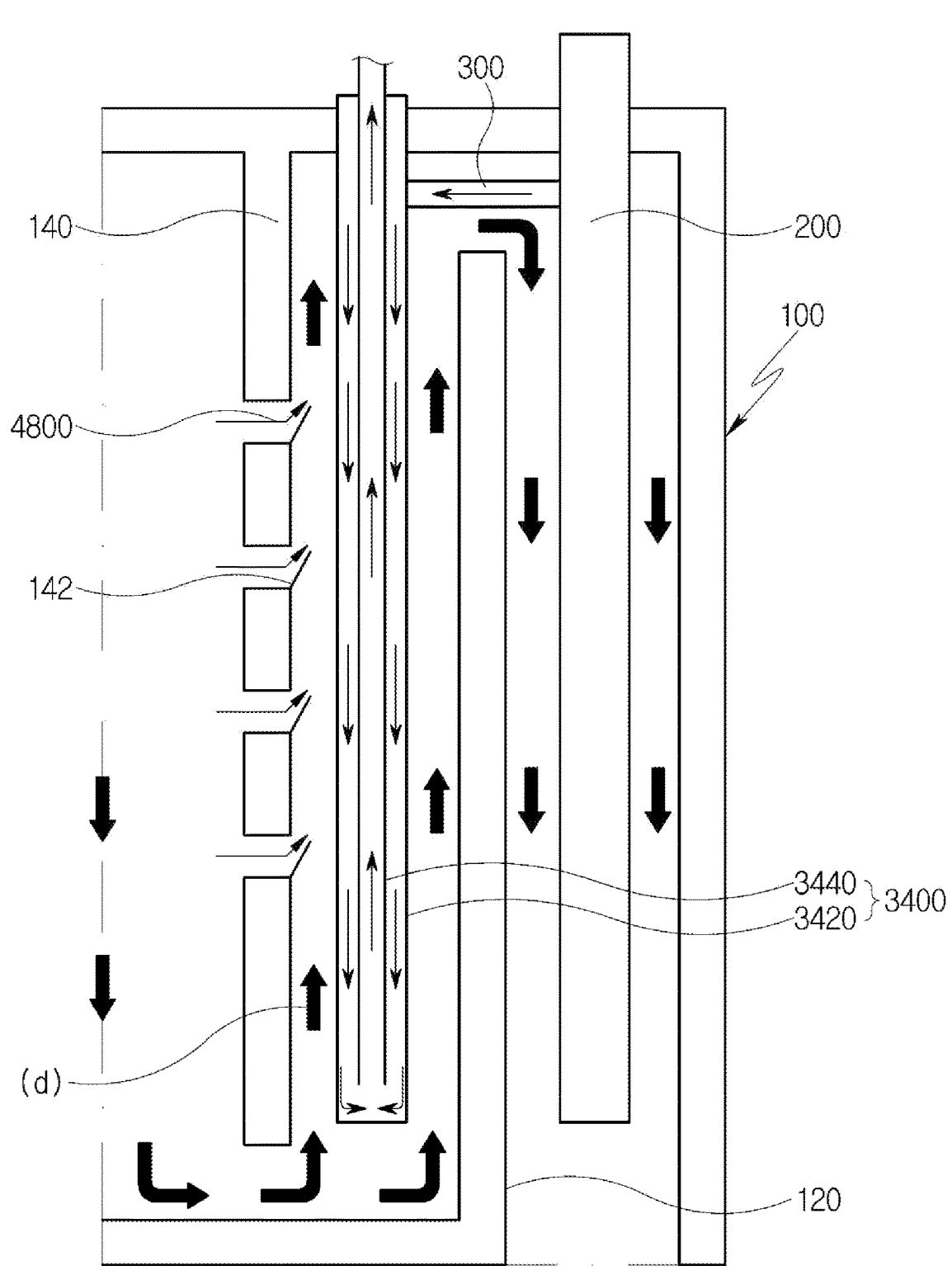

[FIG. 16]
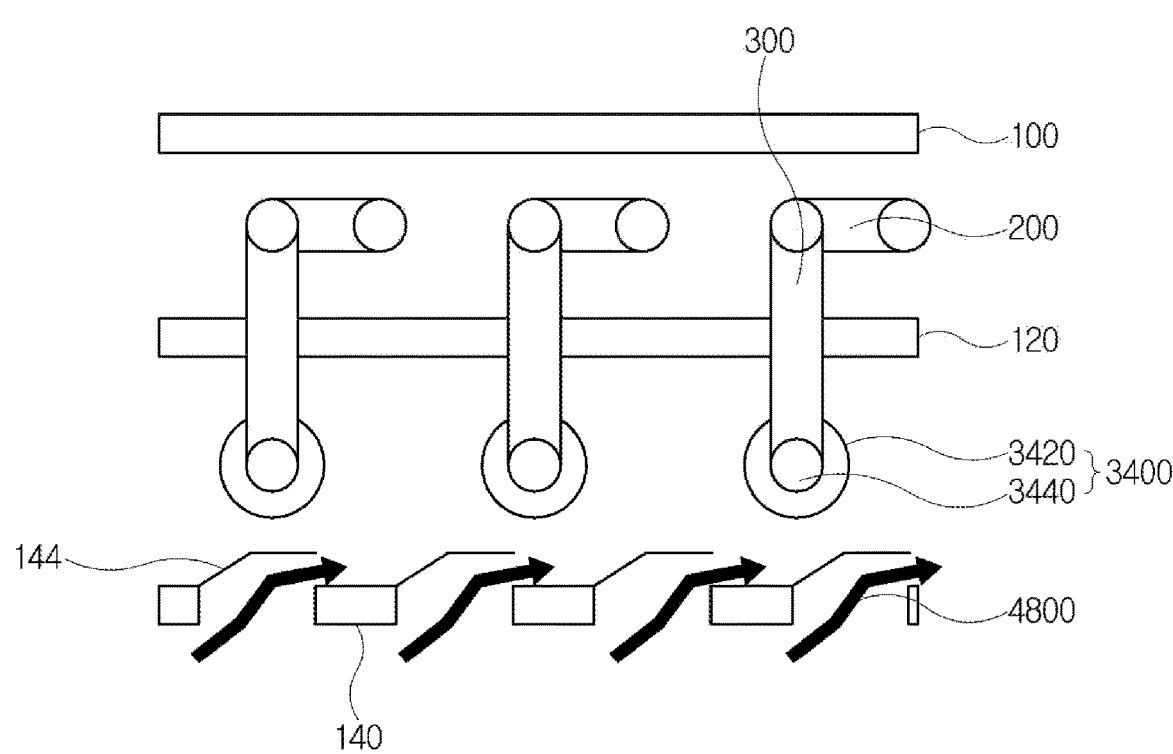

[FIG. 17]
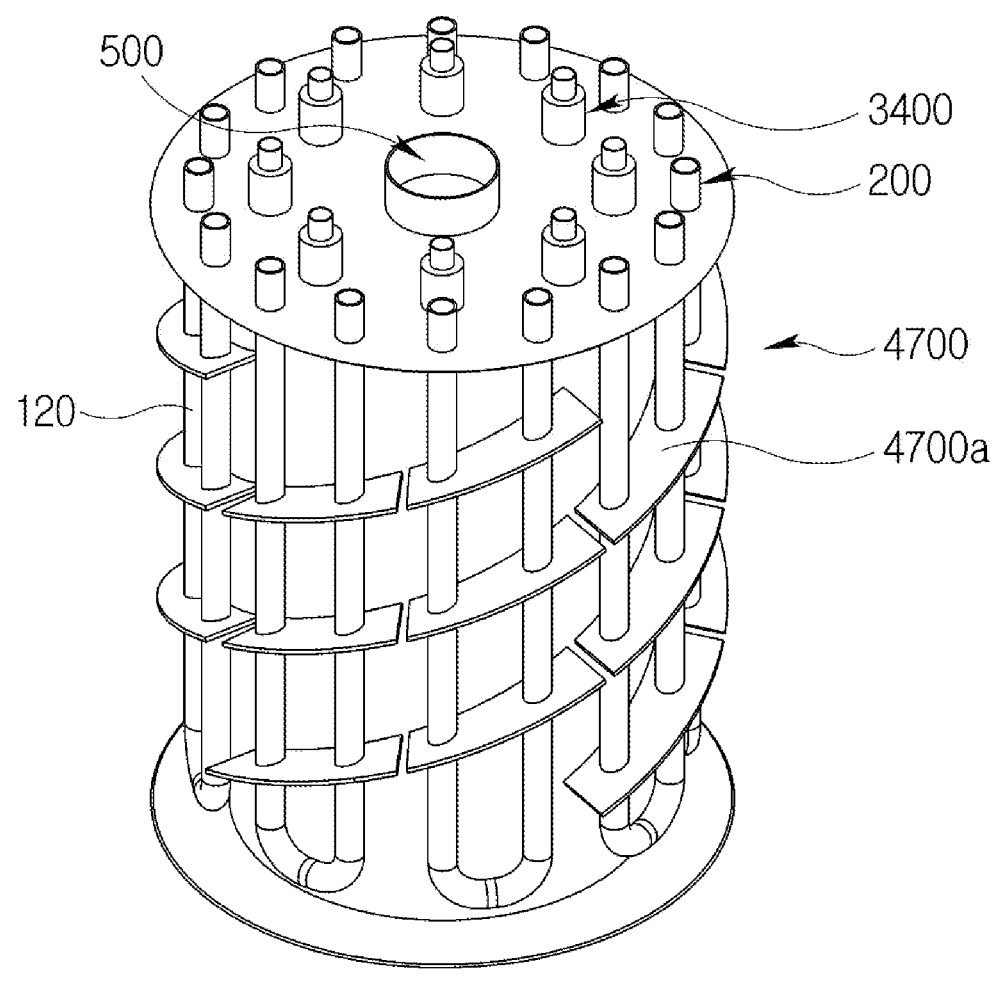

[FIG. 18]
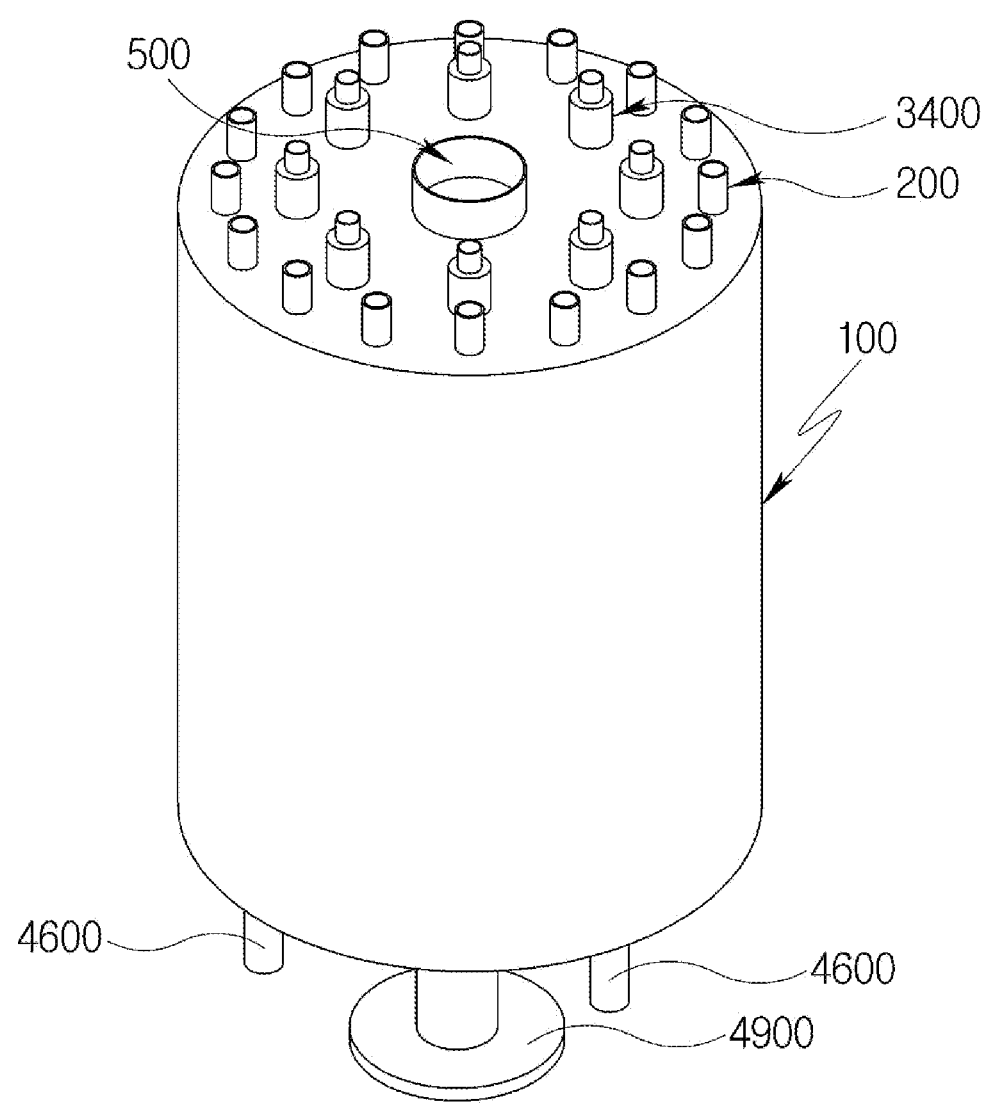

[FIG. 19]
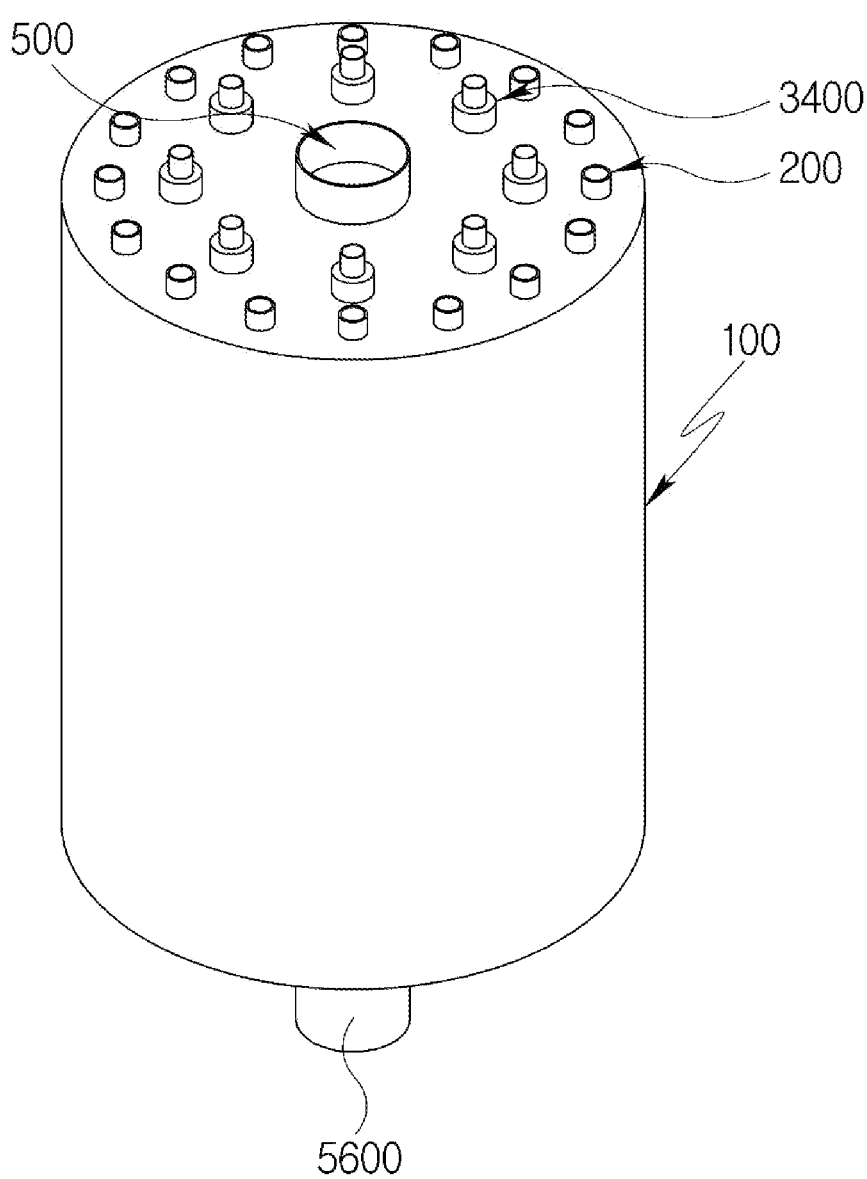

[FIG. 20]
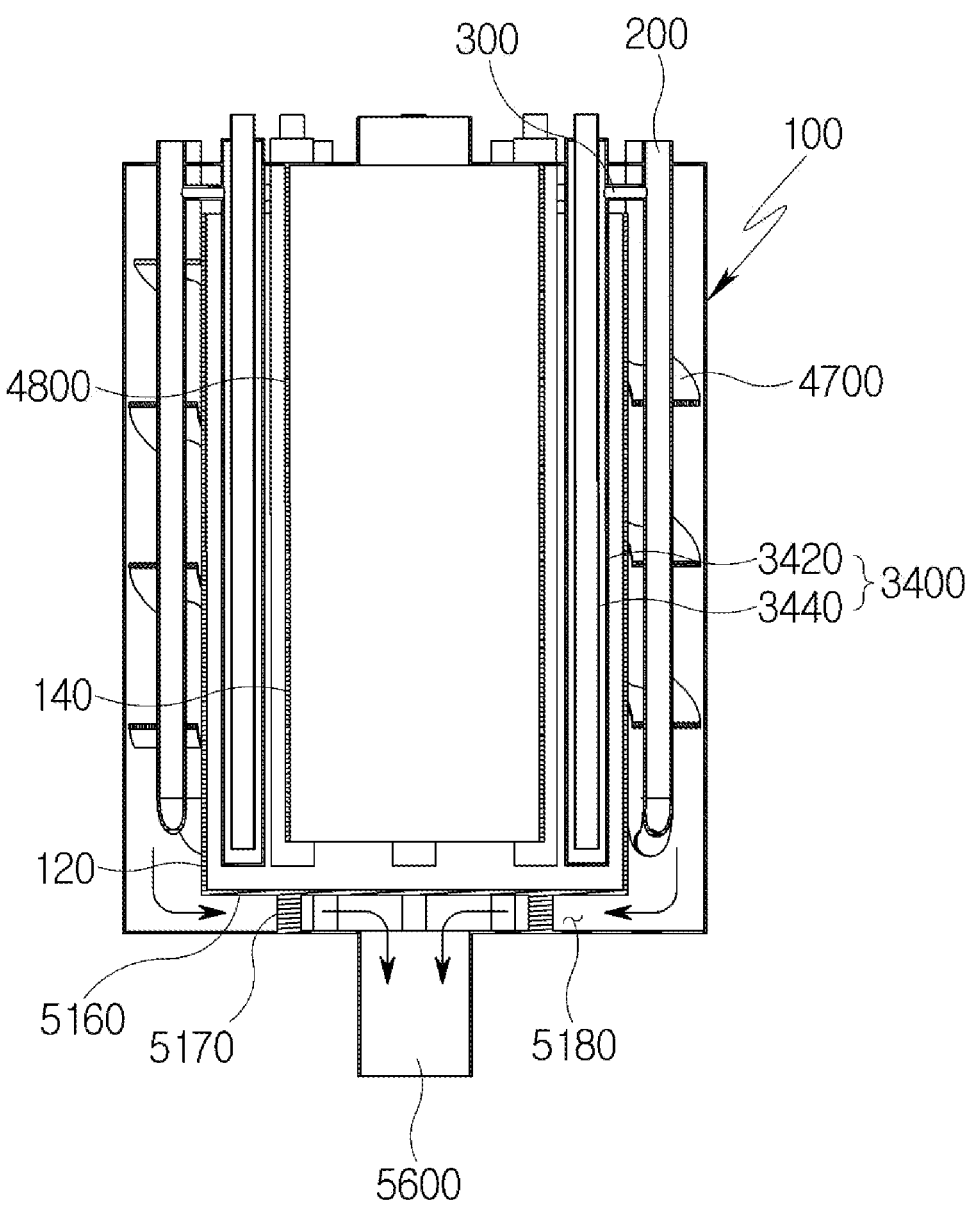

COMBINED REFORMING APPARATUS

CROSS REFERENCE TO RELATED APPLICATION

This is a continuation-in-part application of U.S. patent application Ser. No. 17/548,573, filed on Dec. 12, 2021, which claims priority to Korean Patent Application No. 10-2021-0132413, filed on Oct. 6, 2021, the disclosures of which are incorporated herein by reference in its entirety for all purposes.

BACKGROUND

1. Field

Apparatuses and methods consistent with exemplary embodiments relate to a combined reforming apparatus, and more particularly, to a combined reforming apparatus including two or more catalyst tubes reacting at different temperatures, and allowing different reforming reactions to be performed subsequently as the combustion gas supplies heat to two or more catalyst tubes one after another.

2. Description of the Related Art

A related art steam methane reformer (SMR) is an apparatus for reforming natural gas containing methane ($CH_4$) as a main component. The related art steam methane reformer has a problem in that the structure and process are complicated because a preliminary reformer for reforming high carbon-number hydrocarbons into methane is required when reforming a gas containing a hydrocarbon (CxHy) having a high carbon number.

SUMMARY

Aspects of one or more exemplary embodiments provide a combined reforming apparatus including two or more catalyst tubes reacting at different temperatures, and allowing different reforming reactions to be performed subsequently as the combustion gas supplies heat to two or more catalyst tubes one after another.

Additional aspects will be apparent in part in the description which follows and, in part, will become apparent from the description from the following description, or may be learned by practice of the exemplary embodiments.

According to an aspect of an exemplary embodiment, there is provided a combined reforming apparatus including: a body; one or more first catalyst tubes disposed inside the body and configured to react at a first temperature; one or more second catalyst tubes disposed inside the body, connected to the first catalyst tube, and configured to react at a second temperature higher than the first temperature; and a combustion unit configured to supply heat to the first and second catalyst tubes.

The one or more first catalyst tubes may be configured to receive hydrocarbon gas including methane and carbon dioxide, allow the methane ($CH_4$) to react with steam therein to be reformed into synthesis gas including hydrogen ($H_2$) and carbon monoxide (CO), and the one or more second catalyst tubes is configured to receive the methane and allow the methane to react with carbon dioxide therein to be reformed into synthesis gas including hydrogen and carbon monoxide.

Combustion gas discharged from the combustion unit may supply heat to the second catalyst tube and then to the first catalyst tube.

The combustion gas may be discharged through a center portion of the body, and the second catalyst tube may be radially more inner than the first catalyst tube.

The first catalyst tube and the second catalyst tube may be arranged in parallel along a longitudinal direction of the body, and a first wall extending from a first side of the body is disposed between the first catalyst tube and the second catalyst tube.

A second wall extending from a second side of the body may be disposed more inward than the second catalyst tube.

The first catalyst tube may include a plurality of first catalyst tubes and the second catalyst tube may include a plurality of second catalyst tubes.

The plurality of second catalyst tubes may be arranged at intervals along a circumferential direction of the body, and the plurality of first catalyst tubes may be arranged to surround the plurality of second catalyst tubes.

The first catalyst tube or the second catalyst tube may have a U-curved portion.

The U-curved portion may extend along a circumferential direction of the body.

The second catalyst tube may be connected to a synthesis gas discharge unit through which the synthesis gas is discharged outside, and the synthesis gas discharge unit may be in contact with the first catalyst tube to perform heat exchange with the first catalyst tube.

The combined reforming apparatus may further include a spiral heat exchange tube configured to be wound around an outer circumferential surface of the body or to be wound around an inner circumferential surface of the body.

Hydrocarbon gas and steam may be supplied to the spiral heat exchange tube, move spirally through the spiral heat exchange tube, and then flow into the first catalyst tube.

The second catalyst tube may be a double tube comprising an outer tube and an inner tube, the inner tube that communicates with the outer tube and is disposed inside the outer tube.

A plurality of first catalyst tubes and a plurality of second catalyst tubes may be provided, and a plurality of combustion gas discharge units, through which the combustion gas supplied by the combustion unit is discharged after supplying heat to the plurality of the first catalyst tubes and the plurality of the second catalyst tubes, may be spaced apart at a uniform interval along a circumferential direction of the body.

The plurality of combustion gas discharge units may be disposed on side surfaces of the body.

The plurality of combustion gas discharge units may be disposed on a lower surface of the body, and further include a support unit for supporting the body.

A plurality of first catalyst tubes and a plurality of second catalyst tubes may be provided, a discharge chamber, into which the combustion gas supplied by the combustion unit is gathered after supplying heat to the plurality of the first catalyst tubes and the plurality of the second catalyst tubes, may be formed in the body, and a combustion gas discharge unit through which the combustion gas is discharged outside may be formed in the discharge chamber.

The discharge chamber may be formed between a lower surface of the body and a separation wall supported by the support unit to be spaced apart from the lower surface.

The combustion gas is supplied to a center portion of the body, and the plurality of second catalyst tubes may be disposed on a radially inner side of the body than the plurality of first catalyst tubes, a first wall provided between the plurality of first catalyst tubes and the plurality of second catalyst tubes; and a second wall disposed radially inward of the plurality of second catalyst tubes may be further provided, and the first wall may extend from the separation wall.

A guide plate having a helical shape and passing through the plurality of first catalyst tubes to guide the combustion gas may be further provided.

The plurality of first catalyst tubes may penetrate the guide plate to be fitted thereinto.

The guide plate may be composed of a plurality of sub plates which are divided at each portion of the first catalyst tubes through which the guide plate passes.

A flow hole through which the combustion gas flows may be formed in the second wall.

A plurality of flow holes may be formed along a flow direction in which the combustion gas flows through the second catalyst tube, and an interval between adjacent flow holes in the flow direction may narrow toward the flow direction of the combustion gas.

A first inclined portion formed inclinedly toward a flow direction in which the combustion gas flows along the second catalyst tube may be formed at a portion of the second wall surrounding the flow hole.

The first inclined portion may be formed by a lancing process applied to the second wall.

A second inclined portion formed inclinedly circumferentially toward a radially outside of the body may be formed at a portion of the second wall surrounding the flow hole such that the combustion gas that has flown through the flow hole flows in a circumferential direction of the body.

According to one or more exemplary embodiments, because the combined reforming apparatus includes two or more catalyst tubes reacting at different temperatures, and the combustion gas supplies heat to two or more catalyst tubes one after another, different reforming reactions may be performed subsequently. For example, if pyrolysis gas and steam are provided, hydrocarbons having two or more carbon atoms can be reformed into methane by reacting with the steam and the methane can be reformed into synthesis gas by reacting with the steam. At this instance, there is no need to additionally install a preliminary reformer, thereby simplifying the structure and process for gas reforming. As another example, if biogas and steam are provided, methane can be reformed into synthesis gas by reacting with the steam (wet reforming) and the methane can be reformed into synthesis gas by reacting with carbon dioxide (dry reforming). At this instance, an apparatus for removing carbon dioxide is not needed as removing carbon dioxide from biogas to be supplied to the reforming apparatus is not necessary.

In addition, because the first catalyst tube or the second catalyst tube has at least one U-curved portion depending on a required time for gas reforming, it is possible to adjust the total reaction time.

In addition, it is possible to heat the hydrocarbon gas and steam supplied to the first catalyst tube using waste heat of combustion gas or synthesis gas.

In addition, it is possible to prevent concentration of combustion gas so that the deviation in heat absorption amounts among the plurality of first catalyst tubes can be reduced, since a plurality of combustion gas discharge units are disposed at a regular interval along a circumferential direction of the body, or the combustion gas discharge unit is provided in a separate discharge chamber formed in the body.

In addition, it is possible to reduce deviation in heat absorption amounts according to lengths of each second catalyst tube, since a flow hole through which the combustion gas flows is formed in the second wall.

BRIEF DESCRIPTION OF THE DRAWINGS

The above and other aspects will be more apparent from the following description of the exemplary embodiments with reference to the accompanying drawings, in which:

FIG. 1 is a cross-sectional view illustrating a combined reforming apparatus according to a first exemplary embodiment;

FIG. 2 is a cross-sectional view taken along line A-A' of FIG. 1;

FIG. 3 is a cross-sectional view taken along line B-B' of FIG. 1;

FIG. 4 is a cross-sectional view illustrating another example of FIG. 3;

FIG. 5 is a cross-sectional view illustrating a combined reforming apparatus according to a second exemplary embodiment;

FIG. 6 is a cross-sectional view illustrating a combined reforming apparatus according to a third exemplary embodiment;

FIG. 7 is a cross-sectional view illustrating a combined reforming apparatus according to a fourth exemplary embodiment;

FIG. 8 is a cross-sectional view illustrating a combined reforming apparatus according to a fifth exemplary embodiment;

FIG. 9 is a cross-sectional view taken along line A-A' of FIG. 8;

FIG. 10 is a perspective view illustrating a combined reforming apparatus according to a sixth embodiment of the present disclosure;

FIG. 11 is a perspective view illustrating the combined reforming apparatus of FIG. 10 in which a part of the body is omitted;

FIG. 12 is a cross-sectional view of the combined reforming apparatus of FIG. 10;

FIG. 13 is a front view illustrating a part of the second wall of FIG. 12;

FIGS. 14 to 15 are cross-sectional views illustrating other embodiments of the second wall;

FIG. 16 is a plan view illustrating another embodiment of the second wall;

FIG. 17 is a perspective view illustrating another embodiment of the guide plate;

FIG. 18 is a perspective view illustrating a combined reforming apparatus according to a seventh embodiment of the present disclosure;

FIG. 19 is a perspective view illustrating a combined reforming apparatus according to an eighth embodiment of the present disclosure; and FIG. 20 is a cross-sectional view of the combined reforming apparatus of FIG. 19.

DETAILED DESCRIPTION

Various modifications and various embodiments will be described with reference to the accompanying drawings. However, it should be noted that the various embodiments are not for limiting the scope of the disclosure to the specific embodiment, but they should be interpreted to include all modifications, equivalents, or substitutions of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Hereinafter, a combined reforming apparatus according to a first exemplary embodiment will be described with reference to the accompanying drawings. FIG. 1 is a cross-sectional view illustrating a combined reforming apparatus according to a first exemplary embodiment. FIG. 2 is a cross-sectional view taken along line A-A' of FIG. 1. FIG. 3 is a cross-sectional view taken along line B-B' of FIG. 1.

Referring to FIGS. 1 to 3, a combined reforming apparatus includes a body 100, a first catalyst tube 200, an intermediate tube 300, a second catalyst tube 400, a combustion unit 500, a combustion gas discharge unit 600, and a synthesis gas discharge unit 700.

The body 100 is formed in a cylindrical shape having an inner space to define an external shape of the combined reforming apparatus. However, it is understood that the shape of the body 100 is not limited to the cylindrical shape.

Two or more catalyst tubes containing different catalysts reacting at different temperatures are disposed in the body 100. For example, the first catalyst tube 200 reacting at a first temperature T1 and the second catalyst tube 400 reacting at a second temperature T2 higher than the first temperature T1 are provided. The first temperature T1 and the second temperature T2 may be set differently according to reactions to be formed in the first catalyst tube 200 and the second catalyst tube 400.

The present embodiment will be described on the basis of a case where hydrocarbon gas including methane and carbon dioxide (e.g., biogas) and steam are supplied to the first catalyst tube 200, methane reacts with steam in the first catalyst tube 200 to be reformed into synthesis gas including hydrogen and carbon monoxide (wet reforming), and methane reacts with carbon dioxide to be reformed into synthesis gas including hydrogen and carbon monoxide in the second catalyst tube 400 (dry reforming).

The first temperature T1, which is the reaction temperature of the first catalyst tube 200, may be about 450° C. to 650° C., and a catalyst for reforming methane by a wet reforming process may be used. For example, a nickel-based catalyst using MgO or $Al_2O_3$ or a combination thereof as a support may be used for the first catalyst tube 200. Accordingly, in the first catalyst tube 200, methane reacts with steam to be reformed into synthesis gas including hydrogen and carbon monoxide through reactions represented by Reaction Formula 1 below (wet reforming).

$$CH_4+H_2O \rightarrow CO+3H_2 \qquad \text{Reaction Formula 1:}$$

The second temperature T2, which is the reaction temperature of the second catalyst tube 400, may be about 650° C. to 850° C., and a catalyst for dry reforming methane may be used. Accordingly, in the second catalyst tube 400, methane reacts with carbon dioxide to be reformed into synthesis gas including hydrogen and carbon monoxide through a reaction represented by Reaction Formula 2 below (dry reforming).

$$CH_4+CO_2 \rightarrow 2CO+2H_2 \qquad \text{Reaction Formula 2:}$$

At this instance, it has been described that the wet reforming reaction of methane is performed in the first catalyst tube 200, however the wet reforming reaction of methane may be partially performed in the second catalyst tube 400 as well since the wet reforming reaction of methane may take place in a wide temperature range.

The first catalyst tube 200 and the second catalyst tube 400 are connected through the intermediate tube 300 so that hydrocarbon gas and steam supplied to the first catalyst tube 200 flow sequentially through the first catalyst tube 200, the intermediate tube 300, and the second catalyst tube 400.

Accordingly, the hydrocarbon gas (here, biogas including methane and carbon dioxide) and steam supplied to the first catalyst tube 200 can be reformed into synthesis gas through a wet reforming reaction and a dry reforming reaction while sequentially passing through the first catalyst tube 200 and the second catalyst tube 400. In this case, a carbon dioxide removal apparatus is not needed since there is no need to remove carbon dioxide from biogas before supplying it to the reforming apparatus.

The combustion unit 500 for supplying heat to the first catalyst tube 200 and the second catalyst tube 400 is installed in an upper center of the body 100. In the combustion unit 500, the hydrocarbon gas is combusted to generate combustion gas. The generated combustion gas is discharged to an outside through the center of the body 100.

Because the second catalyst tube 400 reacts at a higher temperature than the first catalyst tube 200, it is effective that the combustion gas discharged from the combustion unit 500 first supplies heat to the second catalyst tube 400, and then supplies heat to the first catalyst tube 200. To this end, the second catalyst tube 400 is positioned radially inside the body 100 rather than the first catalyst tube 200. Referring to FIG. 2, the first catalyst tube 200 and the second catalyst tube 400 may include a plurality of first catalyst tubes 200 and a plurality of second catalyst tubes 400. The plurality of second catalyst tubes 400 are arranged at intervals in a circumferential direction of the body 100. FIG. 2 illustrates a case in which eight second catalyst tubes 400 are spaced apart from each other at regular intervals along the circumferential direction of the body 100, but it is understood that this is only an example and other exemplary embodiments are not limited thereto. Also, the plurality of first catalyst tubes 200 are spaced apart from each other along the circumferential direction of the body 100 and are disposed to surround the plurality of second catalyst tubes 400. The plurality of first catalyst tubes 200 and the plurality of second catalyst tubes 400 extend vertically along a longitudinal direction of the body 100.

The number of the first catalyst tubes 200 may be equal to the number of the second catalyst tubes 400, and the first catalyst tubes 200 and the second catalyst tubes 400 may be connected one-to-one. Therefore, the number of the intermediate tubes 300 is the same as the number of the first catalyst tubes 200 and as the number of the second catalyst tubes 400. For example, eight first catalyst tubes 200 are arranged to surround eight second catalyst tubes 400, and the eight first catalyst tubes 200 are connected to the eight second catalyst tubes 400 through eight intermediate tubes 300. However, it is understood that this is only an example and other exemplary embodiments are not limited thereto. Alternatively, the number of the second catalyst tubes 400 may be greater than the number of the first catalyst tubes 200 so that each first catalyst tube 200 may be connected to a plurality of second catalyst tubes 400.

As another example, the first catalyst tube 200 may be disposed on a radially inner side of the body 100 than the second catalyst tube 400 such that the combustion gas supplies heat to the first catalyst tube 200 and then supplies heat to the second catalyst tube 400.

Referring to FIG. 3, the first catalyst tube 200 has a U-curved portion 220. For example, each of the plurality of first catalyst tubes 200 extends vertically downward from an upper side of the body 100, then curves in a U shape at a lower end (i.e., U-curved portion 220), and then extends vertically upward. The number of U-curved portions 220 may be adjusted according to a catalyst reaction time. As the required catalyst reaction time increases, the number of U-curved portions 220 may increase.

It is preferable that the U-curved portion 220 extends along the circumferential direction of the body 100. That is, the vertically extending portions in each of the plurality of first catalyst tubes 200 are positioned at the same radial distance from the center of the body 100. Accordingly, the length of the first catalyst tube 200 can be adjusted according to the required catalyst reaction time, and a combined reforming apparatus can be formed in a compact configuration. In addition, each of the plurality of second catalyst tubes 400 may also have a U-curved portion.

Here, a first end of the intermediate tube 300 is connected to the first catalyst tube 200, and a second end of the intermediate tube 300 is connected to the second catalyst tube 400. Therefore, the hydrocarbon gas and steam supplied to the first catalyst tube 200 passes sequentially through the U-curved portion 220, the end of the first catalyst tube 200, the intermediate tube 300, and the second catalyst tube 400. FIG. 4 is a cross-sectional view illustrating another example of FIG. 3

However, it is understood that this is just an example and one or more other exemplary embodiments are not limited thereto. For example, according to another exemplary embodiment as illustrated in FIG. 4, one end of the intermediate tube 300' may be connected to a U-curved portion 220' of the first catalyst tube 200'. Therefore, hydrocarbon gas and steam are introduced into the U-curved portion 220' from both sides thereof, respectively, and meet in the U-curved portion 220'. Thereafter, the hydrocarbon gas and the steam may flow together through the intermediate tube 300' and the second catalyst tube 400.

Referring to FIG. 2, a first wall 120 and a second wall 140 are provided in the body 100. The first and second walls 120 and 140 guide the flow of the combustion gas discharged from the combustion unit 500 to effectively supply heat to the first catalyst tubes 200 and the second catalyst tubes 400. The first wall 120 is provided between the first catalyst tube 200 and the second catalyst tube 400, and vertically extends upwardly from the lower side of the body 100. The second wall 140 is disposed inside the second catalyst tube 400 in the radial direction, and extends vertically downward from the upper side of the body 100. Accordingly, the combustion gas discharged from the combustion unit 500 flows in a zigzag direction along the longitudinal direction of the first catalyst tube 200 and the second catalyst tube 400, thereby supplying sufficient heat to the first and second catalyst tubes 200 and 400 and generating a temperature gradient in the first and second catalyst tubes 200 and 400. The first catalyst tube 200 and/or the second catalyst tube 400 may be provided with fins to improve heat transfer efficiency.

Referring to FIG. 1, the combustion gas discharged from the combustion unit 500 flows downward, passes through a space under the second wall 140, flows through the second catalyst tube 400, and flows upward to supply heat to the second catalyst tube 400. Thereafter, the combustion gas that is slightly cooled to heat the second catalyst tube 400 passes a space above the first wall 120 and flows toward the first catalyst tube 200 to provide heat to a next first catalyst tube 200. After supplying heat to the first catalyst tube 200 and the second catalyst tube 400, the combustion gas is discharged to the outside by the combustion gas discharge unit 600 provided in the body 100.

As described above, the hydrocarbon gas sequentially flows through the first catalyst tube 200 and the second catalyst tube 400 and may be reformed into synthesis gas through the wet reforming reaction and the dry reforming reaction. The synthesis gas discharge unit 700 for discharging synthesis gas is connected to the second catalyst tube 400. The synthesis gas discharge unit 700 may gather the synthesis gas generated by the plurality of second catalyst tubes 400 and discharge the synthesis gas to the outside.

According to some implementations, hydrocarbons having 2 or more carbon atoms and steam may be supplied to the first catalyst tube 200. In particular, the hydrocarbon gas supplied to the first catalyst tube 200 may be a pyrolysis gas generated through pyrolysis of wastes. For example, the hydrocarbon gas may be a pyrolysis gas generated by pyrolysis of waste plastics, and the hydrocarbon gas may contain a large amount of hydrocarbons having 2 or more carbon atoms. Hereinafter, reforming reactions will be described which takes place in the first catalyst tube 200 and the second catalyst tube 400 when pyrolysis gas and steam are supplied to the first catalyst tube 200. The combined reforming apparatus in this case has the same structure as the combined reforming apparatus described above except for the reforming reactions and related reaction conditions.

When the pyrolysis gas and steam are supplied to the first catalyst tube 200, higher hydrocarbons having 2 or more carbon atoms, such as ethane, propane, and butane, may be converted into methane, carbon monoxide, and hydrogen in the first catalyst tube 200, by reacting with steam through Reaction Formulas 3 and 4. The first temperature T1, which is the reaction temperature of the first catalyst tube 200, may be about 350° C. to 550° C. In the first catalyst tube 200, a catalyst for reforming hydrocarbons having two or more carbon atoms is used.

$$CnHm + nH_2O \rightarrow nCO + (n + m/2)H_2 \qquad \text{Reaction Formula 3:}$$

$$CO + 3H_2 \rightarrow CH_4 + H_2O \qquad \text{Reaction Formula 4:}$$

In the second catalyst tube 400, methane reacts with steam through Reaction Formula 1 and is reformed into synthesis gas containing hydrogen and carbon monoxide. The second temperature T2, which is the reaction temperature of the second catalyst tube 400, may be about 700° C. to 900° C. In the second catalyst tube 400, a catalyst for reforming methane by a wet reforming process may be used.

$$CH_4 + H_2O \rightarrow CO + 3H_2 \qquad \text{Reaction Formula 1:}$$

At this instance, it has been described that the wet reforming reaction of methane according to Reaction Formula 1 is performed in the second catalyst tube 400, however the wet reforming reaction according to Reaction Formula 1 may be also partially performed in the first catalyst tube 200 as well since the wet reforming reaction of methane may take place in a wide temperature range.

Accordingly, even though the hydrocarbon gas supplied to the first catalyst tube 200 contains a large amount of hydrocarbons having 2 or more carbon atoms, the hydrocarbon gas can be reformed into synthesis gas through a steam reforming reaction while sequentially passing through the first catalyst tube 200 and the second catalyst tube 400. That is, higher hydrocarbons having 2 or more carbon atoms may be converted into methane in the first catalyst tube 200, and then the methane produced in the first catalyst tube 200 may be introduced into the second catalyst tube 400, where it is further converted into synthesis gas.

FIG. 5 is a cross-sectional view illustrating a combined reforming apparatus according to a second exemplary embodiment.

Referring to FIG. 5, because the combined reforming apparatus according to the second exemplary embodiment has the same structure as the combined reforming apparatus according to the first exemplary embodiment except for a spiral heat exchange tube 800, a redundant description of the same configuration will be omitted. For example, the spiral heat exchange tube 800 may be wound around an outer circumferential surface of the body 100. Alternatively, the spiral heat exchange tube 800 may be wound around an inner circumferential surface of the body 100.

The hydrocarbon gas and steam supplied to the spiral heat exchange tube 800 flow spirally through the spiral heat exchange tube 800 and then flow into the first catalyst tube 200. The hydrocarbon gas and steam may be heated before being introduced into the first catalyst tube 200 by exchanging heat with combustion gas existing in the body 100 while moving through the spiral heat exchange tube 800. As such, it is possible to increase the efficiency of the combined reforming apparatus by using the heat of the combustion gas before the combustion gas is discharged to the outside from the body 100.

FIG. 6 is a cross-sectional view illustrating a combined reforming apparatus according to a third exemplary embodiment.

Because the combined reforming according to the third exemplary embodiment has the same structure as the combined reforming apparatus according to the first exemplary embodiment except for a synthesis gas discharge unit 1700, a redundant description of the same configuration will be omitted. Referring to FIG. 6, the synthesis gas discharge unit 1700 is in contact with the first catalyst tube 200 to be able to exchange heat with the first catalyst tube 200. That is, the synthesis gas discharge unit 1700 extends from one end of the second catalyst tube 400, then extends through the first wall 120, and extends in contact with and in parallel with the first catalyst tube 200. With this structure, the hydrocarbon gas and steam in the first catalyst tube 200 can receive heat from the synthesis gas as well as from the combustion gas. This is because the waste heat of the synthesis gas is used to improve the efficiency of the combined reforming apparatus before the synthesis gas is discharged to the outside of the body 100.

FIG. 7 is a cross-sectional view illustrating a combined reforming apparatus according to a fourth exemplary embodiment.

Because the combined reforming apparatus according to the fourth exemplary embodiment has the same structure as the combined reforming apparatus according to the first exemplary embodiment except that the second catalyst tube 2400 has a U-curved portion and the second wall is not included, a redundant description of the same configuration will be omitted.

Referring to FIG. 7, the combined reforming apparatus includes a plurality of first catalyst tubes 2200 and a plurality of second catalyst tubes 2400. The plurality of second catalyst tubes 2400 are arranged at intervals in the circumferential direction of the body 100, and the plurality of first catalyst tubes 2200 are arranged to surround the plurality of second catalyst tubes 2400. The plurality of first catalyst tubes 2200 and the plurality of second catalyst tubes 2400 extend vertically along the longitudinal direction of the body 100.

Here, unlike the first exemplary embodiment in which the first catalyst tube 200 has the U-curved portion 220, the second catalyst tube 2400 has a U-curved portion 2420. For example, each of the plurality of second catalyst tubes 2400 extends vertically upward from the lower side of the body 100, then is curved in a U shape at the upper end (i.e., U-curved portion 2420), and then extends vertically downward. The number of U-curved portions 2420 may be adjusted according to a catalyst reaction time. As the required catalyst reaction time increases, the number of U-curved portions 2420 may increase.

FIG. 7 illustrates a case in which the U-curved portion 2420 of the second catalyst tube 2400 extends along the radial direction of the body 100, but it is understood that this is only an example and other exemplary embodiments are not limited thereto. Alternatively, the U-curved portion 2420 may extend along the circumferential direction of the body 100 to make the combined reforming apparatus compact.

A first wall 2120 is provided in the body 100. The first wall 2120 guides the flow of combustion gas discharged from the combustion unit 500 to effectively supply heat to the first catalyst tubes 2200 and the second catalyst tubes 2400. The first wall 2120 is disposed between the first catalyst tube 2200 and the second catalyst tube 2400 and vertically extends downward from the upper side of the body 100. Accordingly, the combustion gas discharged from the combustion unit 500 supplies heat to the second catalyst tube 2400 while flowing downward, and the combustion gas whose temperature is slightly lowered passes through a space under the first wall 2120. Then, the combustion gas flows upward to supply heat to the first catalyst tube 2200. After supplying heat to the first catalyst tube 2200 and the second catalyst tube 2400, the combustion gas is discharged to the outside by the combustion gas discharge unit 600 provided in the body 100.

FIG. 8 is a cross-sectional view illustrating a combined reforming apparatus according to a fifth exemplary embodiment. FIG. 9 is a cross-sectional view taken along line A-A' of FIG. 8.

Because the combined reforming apparatus according to the fifth exemplary embodiment has the same structure as the combined reforming apparatus according to the first exemplary embodiment except for a second catalyst tube 3400 which is a double tube (bayonet tube), a redundant description of the same configuration will be omitted.

Referring to FIGS. 8 and 9, the second catalyst tube 3400 is a double tube including an outer tube 3420 and an inner tube 3440 disposed inside the outer tube 3420. The inner tube 3440 is fixed to the outer tube 3420 at an upper end of the outer tube 3420, extends along a longitudinal direction inside the outer tube 3420. The inner tube 3440 does not contact an end of the outer tube 3420 but forms a certain space therebetween. In other words, the inner tube 3440 and the outer tube 3420 have a generally cylindrical shape and are arranged concentrically. Also, the downward end of the inner tube 3440 does not reach the downward end of the outer tube 3420. Accordingly, the outer tube 3420 and the inner tube 3440 are configured to communicate with each other at their downward ends.

Thus, gas and steam are introduced into the space between the outer tube 3420 and the inner tube 3440 via the intermediate tube 300, originating from the first catalyst tube 200. Within this space, the reforming reaction of methane is performed as the gas and steam flows downward through the outer tube 3420. Thereafter, the gas and steam passing through the outer tube 3420 flow into the inner tube 3440 configured to communicate with the outer tube 3420. Then, the gas and steam move upward through the inner tube 3440 so that methane in the gas may undergo a reforming reaction to generate synthesis gas. The reformed synthesis gas is discharged upward through the synthesis gas discharge unit 3700. This structure increases the reforming efficiency by increasing a methane reforming reaction time in the second catalyst tube 3400.

According to some different implementations, the gas and steam that have been provided via the intermediate tube 300 originating from the first catalyst tube 200 may be introduced into and flow downward in the inner tube 3440 instead of the outer tube 3420, and then may move to and flow upward in the space between the outer tube 3420 and the inner tube 3440.

According to one or more exemplary embodiments, because two or more catalyst tubes are disposed, each reacting at different temperatures in a single body, and combustion gas supplies heat to these two or more catalyst tubes subsequently (i.e., in succession), different reforming reactions may be performed sequentially.

In addition, because the first catalyst tube or the second catalyst tube has at least one U-curved portion depending on a required time for gas reforming, it is possible to adjust the total reaction time.

In addition, it is possible to heat hydrocarbon gas and steam supplied to the first catalyst tube using waste heat of combustion gas or synthesis gas.

Next, a combined reforming apparatus according to a sixth embodiment of the present disclosure will be described with reference to FIGS. 10 to 13.

The combined reforming apparatus according to the sixth embodiment of the present disclosure includes a body 100, a first catalyst tube 200, an intermediate tube 300, a second catalyst tube 3400, a combustion unit 500, a combustion gas discharge unit 4600, a guide plate 4700, and a flow hole 4800.

Here, the body 100, the first catalyst tube 200, the intermediate tube 300, the second catalyst tube 400, and the combustion unit 500 are the same as the combined reforming apparatus according to the fifth embodiment illustrated in FIGS. 8 and 9. That is, a plurality of second catalyst tubes 3400 are double tubes (bayonet tube) composed of an outer tube 3420 and an inner tube 3440 disposed inside the outer tube 3420. Thus, redundant description will be omitted. Hereinafter, the combustion gas discharge unit 4600, the guide plate 4700, and the flow hole 4800 will be mainly described.

If only a single combustion gas discharge unit is provided on one side at a lower end of the body 100, it can lead to a concentration of the flow of the combustion gas toward the discharge unit. This, in turn, may result in uneven heat absorption among the plurality of first catalyst tubes 200. This situation may potentially cause a decrease in hydrogen production efficiency especially if some of the plurality of first catalyst tubes 200 experience lower heat absorption, resulting in a temperature that do not reach the proper temperature level necessary for the catalyst reforming reaction to occur effectively.

Accordingly, in the present embodiment, the plurality of combustion gas discharge unit 4600, which release the combustion gas after providing heat to the plurality of first catalyst tube 200 and the plurality of second catalyst tube 400, are evenly disposed at regular intervals around the circumference of and along a circumferential direction of the body 100. In the present embodiment, as an example, four combustion gas discharge units 4600 are disposed, each being spaced apart by an angle of 90° from an adjacent one. Also, the plurality of combustion gas discharge units 4600 are positioned on lateral surfaces at a lower end of the body 100. By this arrangement, it is possible to mitigate variation in heat absorption levels among the plurality of first catalyst tubes 200. This arrange prevents the concentration of the combustion gas, which could occur if only one combustion gas discharge unit was provided on a single side at the lower end of the body 100.

Further, as illustrated in FIG. 11, according to the embodiment, additionally, the spiral shaped guide plate 4700 can be included, which is configured to pass through the plurality of first catalyst tubes 200 so as to guide the flow of the combustion gas.

The guide plate 4700 may be formed as a spiral shaped plate that surrounds the first wall 120, guiding the flow of the combustion gas in a space located between the first wall 120 and the body 100. The plurality of first catalyst tubes 200 are positioned by passing through or penetrating the guide plate 4700. To this end, the guide plate 4700 is equipped with through holes, through which the plurality of first catalyst tubes 200 pass. These first catalyst tubes 200 may be inserted into the through hole and be fixed (i.e., secured) in place by welding.

Accordingly, as the combustion gas travels all the first catalyst tubes 200 while following the path outlined by and along the spiral shaped guide plate 4700, this configuration further diminishes variation in the heat absorption amounts among the plurality of first catalyst tubes 200. Furthermore, as the rate at which the combustion gas travels through the first catalyst tube 200 increases, leading to an increase in the external heat transfer coefficient, the heat absorption capacity of the first catalyst tubes 200 is consequently elevated. In addition, it is possible to resolve an issue of unevenness in the combustion gas temperature or combustion gas flow, for example, at an entrance of the first catalyst tube 200.

However, in the present embodiment, since the plurality of first catalyst tubes 200 are coupled to one guide plate 4700, an individual after-sale (A/S) service work or a repair work for each of the first catalyst tubes may present challenges.

To resolve this issue, in another embodiment illustrated in FIG. 17, the guide plate 4700 may be composed of a plurality of sub plates 4700a which are divided at each portion of the U-shaped first catalyst tubes 200 through which the guide plate passes. That is, each sub plate 4700a is placed in each of the U-shaped first catalyst tubes 200. When these sub plates 4700a combined, they form a spiral-shaped structure that surrounds the first wall 120. At this instance, neighboring sub plates 4700a may have an interval therebetween; however, ideally, the distance (i.e., the interval) between adjacent sub plates 4700a should be preferably kept to a minimum.

According to the embodiment, as illustrated in FIGS. 12 and 13, additionally, the flow holes 4800, through which the combustion gas passes, may be formed in the second wall 140. A plurality of flow holes 4800 may be formed along a longitudinal direction and a circumferential direction of the second wall 140. Particularly, as illustrated in FIG. 13, it is preferable that the plurality of flow holes 4800 may be formed in a zigzag format. The longitudinal direction of the second wall 140 corresponds to a flow direction d in which the combustion gas flows along the plurality of second catalyst tubes 3400. The flow hole 4800 is illustrated to have a rectangular shape, however, the shape thereof is not limited thereto, and may be circular, oval, and the like.

A central space 510 enclosed by the second wall 140 may be generally in a cylindrical shape and the combustion gas produced from the combustion unit 500 may flow downward within the central space 510. According to this embodiment, in addition to directing the combustion gas in the central space 510 toward the second catalyst tube 3400 through a space beneath the second wall 140, the combustion gas can also flow from the central space 510 toward the second catalyst tube 3400 directly through the plurality of flow holes 4800. In other words, while a portion of the combustion gas in the central space 510 may be provided toward the second catalyst tube 3400 by passing though the space beneath the second wall 140, another portion of the combustion gas in the central space 510 may be provided toward the second catalyst tube 3400 by passing through the plurality of flow holes 4800. By doing so, the combined reforming apparatus may prevent heat absorption concentration solely at the lower end of the second catalyst tube 3400. As a result, it also mitigates the variation in the heat absorption amounts across the lengths of the second catalyst tubes 3400. In addition, as the combustion gas encounters the second catalyst tube 3400 following its passage through the flow hole 4800, there might be an increase in heat flux due to impingement.

In FIGS. 12 and 13, it is illustrated that the plurality of flow holes 4800 are disposed at the same interval. However, as illustrated in FIG. 14, the plurality of flow holes 4800 may be disposed at different intervals in a flow direction d. For example, as it gets closer to an upper side of the second wall 140, that is, as it proceeds upward (i.e., toward the combustion unit 500), the distance or the gap between adjacent flow holes 4800 in the flow direction may become narrower. In other words, the distance or gap between the adjacent flow holes 4800 in the flow direction becomes smaller toward the upward direction. This configuration enhances the heat absorption in in the areas where the heat absorption is low in the second catalyst tube 3400 by positioning a greater number of flow holes 4800.

In addition, as illustrated in FIG. 15, a first inclined portion 142 may be provided, which is formed inclinedly toward a flow direction d (i.e., upward direction) and toward a radially outward direction, along which the combustion gas is guided after passing through the plurality of second catalyst tube 3400. Specifically, the first inclined portion 142 may be formed inclinedly upward and radially outward while being fixed to a lower edge of the flow hole 4800.

By this arrangement, the combustion gas passing through the flow holes 4800 in a radial direction from the central space 510 may flow in the flow direction d (i.e., upward), while flowing toward the second catalyst tube 3400. Then, the combustion gas may be joined with and flow together with the combustion gas flowing from the space beneath the second wall 140, without intervening the flow of the combustion gas from the space beneath the second wall 140. The first inclined portion 142 may be formed in various shapes such as a rectangular surface, or a triangular surface forming a tetrahedron. According to an embodiment, the first inclined portion 142 may be formed by a lancing process applied to the second wall 140. That is, the first inclined portion 142 may be formed by making an incision into a portion at an edge side of the flow hole 4800 into a portion and bending the incised portion, thereby the first inclined portion 142 being formed along with the flow hole 4800. The incision may be made in the lower edge among the four edges of a rectangle-shape flow hole 4800.

According to an embodiment illustrated in FIG. 16, a second inclined portion 144 may be provided, which is formed to be inclined circumferentially and toward the radially outward direction of the body 100, such that the combustion gas flowing through the flow hole 4800 may flow toward a circumferential direction of the body 100. Unlike FIGS. 14 and 15, FIG. 16 is illustrated as a plan view of a portion of the combined reforming apparatus. Specifically, based on the plan view, the second inclined portion 144 is fixed, for example, to the left edge of the flow hole 4800 and inclined toward a radially outward direction, that is, inclined toward the second catalyst tube 3400 and toward a circumferential direction of the body 100.

By this arrangement, the combustion gas that passes through the flow holes 4800 in the radial direction from the central space 510 may flow in the circumferential direction of the body 100 along the second inclined portion 144, while flowing toward the second catalyst tube 3400. Then, the combustion gas may be combined with and flow together with the combustion gas flowing in the flow direction d to flow diagonally (i.e., in an inclined direction circumferentially and upwardly). By this arrangement, as the combustion gas flows through the plurality of catalyst tubes 3400 diagonally, a moving distance and a flow rate of the combustion gas are risen, thereby the heat absorption amount of the second catalyst tube 3400 may be increased. Furthermore, the variation in the heat absorption amounts among the plurality of second catalyst tubes 3400 may be reduced. The second inclined portion 144 may be formed by the similar lancing process applied to the second wall 140 with respect to the first inclined portion 142.

The combined reforming apparatus described above may further include all of the plurality of combustion gas discharge units 4600, the guide plate 4700, and the flow hole 4800 described above, or may include one of them and omit the rest.

Next, a combined reforming apparatus according to a seventh embodiment of the present disclosure will be described with reference to FIG. 18. The combined reforming apparatus according to the seventh embodiment includes the same components of the combined reforming apparatus according to the sixth embodiment but is different in that the plurality of combustion gas discharge units 4600 are disposed on a lower surface of the body 100 such that the combustion gas may be discharged in a downward direction from the body 100, and a support unit 4900 configured to support the body 100 is further included to form a space for the plurality of combustion gas discharge units 4600 below the body 100.

Like the previous embodiments, the plurality of combustion gas discharge units 4600 may be disposed on the lower surface of the body 100 by being spaced apart each other at a regular interval in a circumferential direction of the body 100 and having a same distance from a radial center of the lower surface of the body 100. In addition, the support unit 4900 forms a space for allowing the plurality of combustion gas discharge units 4600 to be disposed below the body 100 by supporting the body 100.

Finally, referring to FIGS. 19 and 20, a combined reforming apparatus according to an eighth embodiment of the present disclosure will be described.

Like the sixth embodiment, the combined reforming apparatus according to the eight embodiment of the present disclosure includes a body 100, a first catalyst tube 200, an intermediate tube 300, a second catalyst tube 3400, a combustion unit 500, a guide plate 4700, and a flow hole 4800. However, there is a difference in that a discharge chamber 5180 is formed in the body 100, and a combustion gas discharge unit 5600 is provided in the discharge chamber 5180.

Specifically, the discharge chamber 5180 is formed in the body 100, such that, after supplying heat to the plurality of the first catalyst tubes 200 and the plurality of the second catalyst tubes 3400, the combustion gas is gathered into the discharge chamber 5180. In the present embodiment, the discharge chamber 5180 is formed at the bottom of the body 100 below the U-curved section of the first catalyst tube 200, specifically, between a lower surface of the body 100 and a separation wall 5160 formed above and parallel to the lower surface. The separation wall 5160 is supported by the support unit 5170 such that the separation wall 5160 is disposed spaced apart from the lower surface of the body 100. The separation wall 5160 is in circular shape in correspondence with a shape of the lower surface of the body 100, but it is preferable that the separation wall 5160 is formed to be smaller than the lower surface of the body 100. In addition, the separation wall 5160 is preferably formed to be closer to the lower surface of the body 100 rather than a lower end of the first catalyst tube 200, that is, a U-curved section of the first catalyst tube 200. The support unit 5170 may be formed in various shapes such as a circular shape, a plate shape, and the like.

If the first wall 120 extends from the lower surface of the body 100 like the first embodiment, the first wall 120 blocks the discharge chamber 5180. Accordingly, the first wall 120 in this embodiment is formed by extending vertically upward from an radial outer end of the separation wall 5160 such that the combustion gas flowing downward in the space between the outer circumferential surface 100 and the first wall 120 flows to the discharge chamber 5180.

It is preferable that the combustion gas discharge unit 5600 is formed at a center of the lower surface of the body 100 and is communicated with the discharge chamber 5180. Accordingly, the combustion gas, that has flowed downward after supplying heat to the plurality of first catalyst tubes 200, may be gathered in the discharge chamber 5180, flow inwardly in the discharge chamber, and then may be discharged through the combustion gas discharge unit 5600. As a result, compared with a case where only one combustion gas discharge unit is provided on one side at the lower end of the body 100, the concentration of the combustion gas does not occur, and the variation in the heat absorption amounts among the plurality of first catalyst tubes 200 may be reduced according to this embodiment.

The combined reforming apparatus according to the present disclosure may control the supply of heat from the combustion unit 500 to the first catalyst tubes 200, 2200 and the second catalyst tubes 400, 2400, 3400 such that the temperature in the first catalyst tube 200, 2200 is maintained in a temperature range of first temperature T1 and the temperature in the second catalyst tube 400, 2400, 3400 is maintained in a temperature range of temperature T2 according to the corresponding embodiments. To control the heat supply and the temperature ranges, the combined reforming apparatus according to the present disclosure may further include temperature sensors in the first catalyst tubes 200, 2200 and the second catalyst tubes 400, 2400, 3400 to detect their temperatures and a controller that receives the detected temperatures from the temperature sensors and controls the combustion unit 500 and the heat supply. The controller may be connected to the combustion unit 500 directly or indirectly to communicate with each other electrically or mechanically.

When the plurality of combustion gas discharge units 4600 are formed spaced apart at a regular interval along the circumferential direction of the body 100 as shown in the sixth or seventh embodiments, or the combustion gas discharge unit 5600 is provided in the separate discharge chamber 5180 formed in the body 100 as shown in the eighth embodiment, the concentration of the combustion gas may be prevented, thereby the variation or deviation in the heat absorption amounts among the plurality of first catalyst tubes may be reduced.

In addition, when the flow hole 4800 through which the combustion gas flows is formed in the second wall 140 according to the present disclosure, the variation or deviation in the heat absorption amounts along the length of each of the second catalyst tubes may be reduced.

While exemplary embodiments have been described with reference to the accompanying drawings, it is to be understood by those skilled in the art that various modifications in form and details may be made therein without departing from the sprit and scope as defined by the appended claims. Also, it is noted that any one feature of an embodiment of the present disclosure described in the specification may be applied to another embodiment of the present disclosure. Therefore, the description of the exemplary embodiments should be construed in a descriptive sense and not to limit the scope of the claims, and many alternatives, modifications, and variations will be apparent to those skilled in the art.

What is claimed is:

1. A combined reforming apparatus comprising:
a body;
one or more first catalyst tubes disposed inside the body and configured to react at a first temperature;
one or more second catalyst tubes disposed inside the body, connected to the first catalyst tube, and configured to react at a second temperature higher than the first temperature; and
a combustion unit configured to supply heat to the first and second catalyst tubes,
wherein a plurality of first catalyst tubes and a plurality of second catalyst tubes are provided, and
wherein a plurality of combustion gas discharge units, through which the combustion gas supplied by the combustion unit is discharged after supplying heat to the plurality of the first catalyst tubes and the plurality of the second catalyst tubes, are spaced apart at a uniform interval along a circumferential direction of the body.

2. The combined reforming apparatus according to claim 1,
wherein the one or more first catalyst tubes configured to receive hydrocarbon gas comprising methane (CH4) and carbon dioxide, allow the methane to react with steam therein to be reformed into synthesis gas comprising hydrogen (H2) and carbon monoxide (CO), and the one or more second catalyst tubes is configured to receive the methane and allow the methane to react with carbon dioxide therein to be reformed into synthesis gas comprising hydrogen and carbon monoxide.

3. The combined reforming apparatus according to claim 1,
  wherein combustion gas discharged from the combustion unit supplies heat to the second catalyst tube and then to the first catalyst tube.

4. The combined reforming apparatus according to claim 3,
  wherein the combustion gas is discharged through a center portion of the body, and the second catalyst tube is radially more inner than the first catalyst tube.

5. The combined reforming apparatus according to claim 3,
  wherein the first catalyst tube and the second catalyst tube are arranged in parallel along a longitudinal direction of the body, and
  a first wall extending from a first side of the body is disposed between the first catalyst tube and the second catalyst tube.

6. The combined reforming apparatus according to claim 5,
  wherein a second wall extending from a second side of the body is disposed more inward than the second catalyst tube.

7. The combined reforming apparatus according to claim 4,
  wherein the first catalyst tube includes a plurality of first catalyst tubes and the second catalyst tube includes a plurality of second catalyst tubes,
  the plurality of second catalyst tubes are arranged at intervals along a circumferential direction of the body, and
  the plurality of first catalyst tubes are arranged to surround the plurality of second catalyst tubes.

8. The combined reforming apparatus according to claim 1,
  wherein the first catalyst tube or the second catalyst tube has a U-curved portion.

9. The combined reforming apparatus according to claim 8,
  wherein the U-curved portion extends along a circumferential direction of the body.

10. The combined reforming apparatus according to claim 1,
  wherein the second catalyst tube is connected to a synthesis gas discharge unit through which the synthesis gas is discharged outside, and
  the synthesis gas discharge unit is in contact with the first catalyst tube to perform heat exchange with the first catalyst tube.

11. A combined reforming apparatus comprising:
  a body;
  one or more first catalyst tubes disposed inside the body and configured to react at a first temperature;
  one or more second catalyst tubes disposed inside the body, connected to the first catalyst tube, and configured to react at a second temperature higher than the first temperature;
  a combustion unit configured to supply heat to the first and second catalyst tubes, and
  a spiral heat exchange tube configured to be wound around an outer circumferential surface of the body or to be wound around an inner circumferential surface of the body,
  wherein hydrocarbon gas and steam are supplied to the spiral heat exchange tube, move spirally through the spiral heat exchange tube, and then flow into the first catalyst tube.

12. The combined reforming apparatus according to claim 1,
  wherein the second catalyst tube is a double tube comprising an outer tube and an inner tube, the inner tube that communicates with the outer tube and is disposed inside the outer tube.

13. The combined reforming apparatus according to claim 1,
  wherein the plurality of combustion gas discharge units are disposed on side surfaces of the body.

14. The combined reforming apparatus according to claim 1,
  wherein the plurality of combustion gas discharge units are disposed on a lower surface of the body, and further comprises a support unit for supporting the body.

15. A combined reforming apparatus comprising:
  a body;
  one or more first catalyst tubes disposed inside the body and configured to react at a first temperature;
  one or more second catalyst tubes disposed inside the body, connected to the first catalyst tube, and configured to react at a second temperature higher than the first temperature; and
  a combustion unit configured to supply heat to the first and second catalyst tubes,
  wherein a plurality of first catalyst tubes and a plurality of second catalyst tubes are provided,
  wherein a discharge chamber, into which the combustion gas supplied by the combustion unit is gathered after supplying heat to the plurality of the first catalyst tubes and the plurality of the second catalyst tubes, is formed in the body, and
  wherein a combustion gas discharge unit through which the combustion gas is discharged outside is formed in the discharge chamber.

16. The combined reforming apparatus according to claim 15,
  wherein the discharge chamber is formed between a lower surface of the body and a separation wall supported by the support unit to be spaced apart from the lower surface.

17. The combined reforming apparatus according to claim 16,
  wherein the combustion gas is supplied to a center portion of the body, and the plurality of second catalyst tubes are disposed on a radially inner side of the body than the plurality of first catalyst tubes,
  wherein a first wall provided between the plurality of first catalyst tubes and the plurality of second catalyst tubes; and a second wall disposed radially inward of the plurality of second catalyst tubes are further provided, and
  wherein the first wall extends from the separation wall.

18. The combined reforming apparatus according to claim 7, further comprising:
  a guide plate having a helical shape and passing through the plurality of first catalyst tubes to guide the combustion gas.

19. The combined reforming apparatus according to claim 18,
  wherein the plurality of first catalyst tubes penetrate the guide plate to be fitted thereinto.

20. The combined reforming apparatus according to claim 18,
  wherein the guide plate is composed of a plurality of sub plates which are divided at each portion of the first catalyst tubes through which the guide plate passes.

21. The combined reforming apparatus according to claim 6, wherein a flow hole through which the combustion gas flows is formed in the second wall.

* * * * *